United States Patent
Mizushima

(10) Patent No.: US 9,092,320 B2
(45) Date of Patent: Jul. 28, 2015

(54) STORAGE SYSTEM WHICH INCLUDES NON-VOLATILE SEMICONDUCTOR STORAGE MEDIUM, AND STORAGE CONTROL METHOD OF STORAGE SYSTEM

(71) Applicant: Hitachi, Ltd., Tokyo (JP)

(72) Inventor: Nagamasa Mizushima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 332 days.

(21) Appl. No.: 13/643,864

(22) PCT Filed: Oct. 15, 2012

(86) PCT No.: PCT/JP2012/006600
§ 371 (c)(1),
(2) Date: Dec. 7, 2012

(87) PCT Pub. No.: WO2014/061055
PCT Pub. Date: Apr. 24, 2014

(65) Prior Publication Data
US 2014/0108702 A1   Apr. 17, 2014

(51) Int. Cl.
*G06F 12/00* (2006.01)
*G06F 12/02* (2006.01)

(52) U.S. Cl.
CPC .... *G06F 12/0246* (2013.01); *G06F 2212/1008* (2013.01); *G06F 2212/1024* (2013.01); *G06F 2212/7202* (2013.01); *G06F 2212/7205* (2013.01); *G06F 2212/7208* (2013.01)

(58) Field of Classification Search
CPC . G06F 12/00; G06F 12/0246; G06F 12/0238; G06F 3/0688; G06F 3/0679
See application file for complete search history.

(56) References Cited

U.S. PATENT DOCUMENTS

| | | |
|---|---|---|
| 2008/0144373 A1 | 6/2008 | Roohparvar |
| 2009/0031074 A1 | 1/2009 | Son |
| 2009/0067241 A1 | 3/2009 | Gorobets et al. |
| 2009/0103356 A1 | 4/2009 | Mokhlesi |
| 2009/0106484 A1 | 4/2009 | Yeh et al. |
| 2009/0122606 A1 | 5/2009 | Kim et al. |
| 2009/0319716 A1* | 12/2009 | Nagadomi ............ 710/316 |
| 2010/0017561 A1* | 1/2010 | Yang et al. ............ 711/103 |

(Continued)

FOREIGN PATENT DOCUMENTS

| | | |
|---|---|---|
| JP | 2005-032431 A | 2/2005 |
| JP | 2009-032261 A | 2/2009 |

(Continued)

OTHER PUBLICATIONS

PCT International Search Report and Written Opinion on application PCT/JP2012/006600 mailed Jul. 22, 2013; 14 pages.

*Primary Examiner* — Cheng-Yuan Tseng
*Assistant Examiner* — Tahilba Puche
(74) *Attorney, Agent, or Firm* — Foley & Lardner LLP

(57) ABSTRACT

Systems and methods of performing a host write process are provided. W blocks are selected from the multiple blocks and W is a natural number. Write target data in accordance with a write command is written to the W next write destination pages which are included in the W blocks respectively. Each block selected is a block whose next write destination page is a first kind page. Each block consists of multiple pages. The multiple pages are two or more first kind pages and two or more second kind pages. Each second kind page is a page with a lower write performance than that of each first kind page.

7 Claims, 18 Drawing Sheets

(56) References Cited

U.S. PATENT DOCUMENTS

| | | | |
|---|---|---|---|
| 2010/0306498 A1* | 12/2010 | Shiga | 711/203 |
| 2011/0029718 A1* | 2/2011 | Frickey et al. | 711/103 |
| 2012/0198124 A1 | 8/2012 | Post et al. | |

FOREIGN PATENT DOCUMENTS

| | | |
|---|---|---|
| JP | 2009-518775 A | 5/2009 |
| JP | 2009-541909 A | 11/2009 |
| JP | 2010-003161 A | 1/2010 |

* cited by examiner

FIG. 10B

| FM chip (1021a) | Number of blocks of which the next write destination is LSB (1022a) | FM chip (1021b) | Number of blocks of which the next write destination is LSB (1022b) |
|---|---|---|---|
| FM1-1 | 402 | FM2-1 | 518 |
| FM1-2 | 395 | FM2-2 | 647 |
| FM1-3 | 498 | FM2-3 | 791 |
| FM1-4 | 504 | FM2-4 | 571 |

| Block (1031) | Next write (1032) | Page type (1033) |
|---|---|---|
| 0 | Page 164 | LSB |
| 1 | Page 42 | MSB |
| 2 | Page 105 | LSB |
| 3 | Page 0 | LSB |
| ... | ... | ... |
| 4093 | Page 23 | MSB |
| 4094 | N/A | N/A |
| 4095 | Page 17 | LSB |

1030

STORAGE SYSTEM WHICH INCLUDES NON-VOLATILE SEMICONDUCTOR STORAGE MEDIUM, AND STORAGE CONTROL METHOD OF STORAGE SYSTEM

TECHNICAL FIELD

The present invention relates to a storage control on a non-volatile semiconductor storage medium.

BACKGROUND ART

A storage system, in general, is configured to provide a logical volume which is created based on the RAID (Redundant Array of Independent Disks) group which is composed of plural storage devices. Recently, as a storage device, in addition to or in place of a HDD (Hard Disk Drive), a non-volatile semiconductor storage device which includes plural non-volatile memory chips as non-volatile semiconductor storage devices, has been adopted. PTL 1 discloses an FM, to be more specific, an NAND flash memory which includes plural flash memory (hereinafter, FM) chips, as a non-volatile semiconductor storage device.

A storage area of an NAND flash memory is divided into plural areas "blocks" each of which is an erase unit. In addition, each block is divided into plural areas "pages" each of which is a unit for read or write. Each page is composed of plural memory cells.

There are two kinds of memory cells which configure an NAND flash memory; an SLC (single Level Cell) type of memory cell which records 1 bit to one memory cell, and an MLC (Multi Level Cell) type of memory cell which records plural bits (in general 2 bits) to one memory cell. PTL 2 discloses a basic configuration and a control method of an NAND flash memory (hereinafter, referred to as MLC memory) which includes an MLC memory cell (MLC type of memory cell). In case of an MLC memory, data from the host apparatus will be written to an LSB (Least Significant Bit) page, or an MSB (Most Significant Bit) page.

In general, there is a problem in a MLC memory cell that it has a less program possible number of times (that is, fewer rewritable number of times) compared to an SLC memory cell (SLC type memory cell). In order to solve the problem, PTL 3 discloses a method to decrease a program number of times of an MLC memory cell by controlling data similar to the data pattern written to an LSB page, not to write to an MSB page.

In general, an MLC memory has a problem that a data error is likely to occur compared to an NAND flash memory (hereinafter, referred to as SLC memory) which includes an SLC memory cell. In order for an MLC memory to be able to use as an SLC memory which an error is unlikely to occur, PTL 4 discloses a method which data programs a reinforcement data to the programmed cell, and adjusts the threshold voltage to a safer condition. In addition, PTL 5 discloses a method on an MLC memory, while data is not being read and written; data executes a reprogram for the programmed cell, and adjusts the threshold voltage to a safer condition.

In general, an MLC memory is an LSB page which has a fast write performance in half of the pages out of plural pages in the block, and also has a feature of being an MSB page which has a slow write performance in the other half of the pages.

PLT 6 discloses a method to skip an MSB page, on a system which an MLC memory is applied to, in order to assign a write destination of the write data based on the write command from the host apparatus in which a fast response is sought, to an LSB page.

CITATION LIST

Patent Literature

[PTL 1] Japanese Patent Application Laid-open No. 2010-3161

[PTL 2] Japanese Patent Application Laid-open No. 2005-32431

[PTL 3] Japanese Patent Application Laid-open No. 2009-32261

[PTL 4] Japanese Patent Application Laid-open No. 2009-518775

[PTL 5] Japanese Patent Application Laid-open No. 2009-541909

[PTL 6] US Patent Application Publication No. 2010/0017561

SUMMARY OF INVENTION

Solution to Problem

There is an MLC memory (hereinafter, referred to as MSB non-skip MLC memory) which has a feature of not allowing (or not recommending) MSB page to skip. In such an MLC memory, it is not possible to avoid writing to an MSB page by the skip in PL 6.

This type of problem may occur on a non-volatile semiconductor storage medium involved in the following regardless of a flash memory.

(*) A non-volatile semiconductor storage medium is composed of plural blocks that are plural physical areas.

(*) Each block is composed of plural pages that are plural sub-areas.

(*) The plural pages are two or more first kind pages, and two or more second kind pages.

(*) A second kind page is a page having a lower write performance than a first kind page.

(*) On each block, it is possible to overwrite data on the same page but therefore a page to be the write destination of the data is supposed to change.

In case a storage system receives a write command from a host apparatus, the storage system performs a host write process including the following processes (a1) and (a2), (a1) selecting the W pieces (W is a natural number) block among plural blocks, (a2) writing a write target data according to a write command, to next write destination page of the W pieces of which each W piece block includes. Next write destination page in each block selected by the process of (a1) is the first kind page.

A storage system may be a semiconductor storage device such as a flash memory PKG 10 described below, and also may be a system having plural semiconductor storage devices and a storage controller (for example, RAID controller device described below) coupled to the plural semiconductor storage devices. In case a storage system is a semiconductor storage device, the host apparatus may be a host 200 described below, and also may be a RAID controller device 300 described below.

It is possible to assign an LSB page for a write destination of the write data from the host apparatus. For this reason, it is possible for MSB non-skip MLC memory to improve a response performance for a write command from the host.

BRIEF DESCRIPTION OF DRAWINGS

FIG. 10B shows an LSB page management table 1020 related to the first embodiment.

FIG. 10C shows an LSB page management table 1030 related to the first embodiment.

DESCRIPTION OF THE EMBODIMENT

In the following explanation, identification information including a number is used to identify an element (for example, a page, a flash memory chip (FM chip), and a switch (SW)), but information that does not includes a number may be used as the identification information.

Also, in the following explanation, when giving an explanation that distinguishes between elements of the same type, a combination of the element name and the identification information may be used in place of a combination of the element name and a reference sign. For example, a switch with the identification information (identification number) "0" may be written as "switch #0".

Also, in the following explanation, an interface device may be abbreviated as "I/F".

Also, in the following explanation, it is supposed that the nonvolatile semiconductor memory is a flash memory (FM). It is also supposed that this flash memory is the type of flash memory in which an erase is performed in units of blocks and an access is performed in units of pages, and typically is a NAND-type flash memory. In detail, it is supposed to be an NAND flash memory of the polytomous type (MLC: Multi Level Cell) which is possible to record 2 bit information in one memory cell.

Also, in the following explanation, since the nonvolatile semiconductor memory is a NAND-type flash memory, the terms page and block will be used. Under a circumstance where a page has already been allocated in a certain logical area and data is stored in the page, when the logical area becomes the write destination of the data, a free page in place of the page will be allocated to the logical area, and the data will be written to the free page. The data written to the free page is the latest data with respect to the logical area, and the data stored in the original page is the old data with respect to the logical area. Hereinbelow, the latest data may be called "valid data" and the old data may be called "invalid data" with regard to each logical area. Furthermore, the page storing the valid data may be called a "valid page", and the page storing the invalid data may be called an "invalid page".

Now then, an overview regarding the intersection of the plural embodiments described below will be explained.

Figure 2:
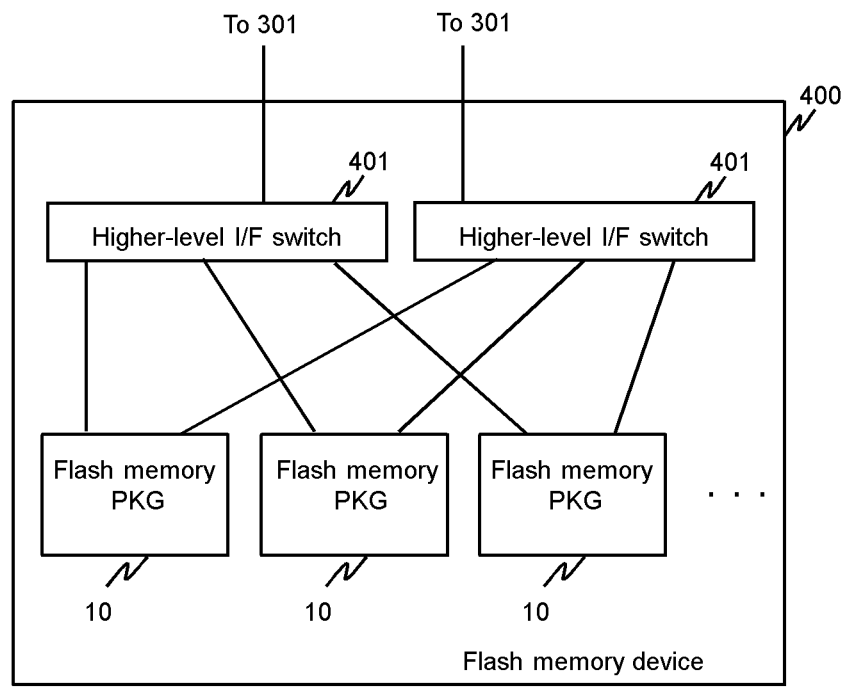
FIG. 2 shows a configuration of a flash memory device 400 related to the first embodiment.
Figure 3:
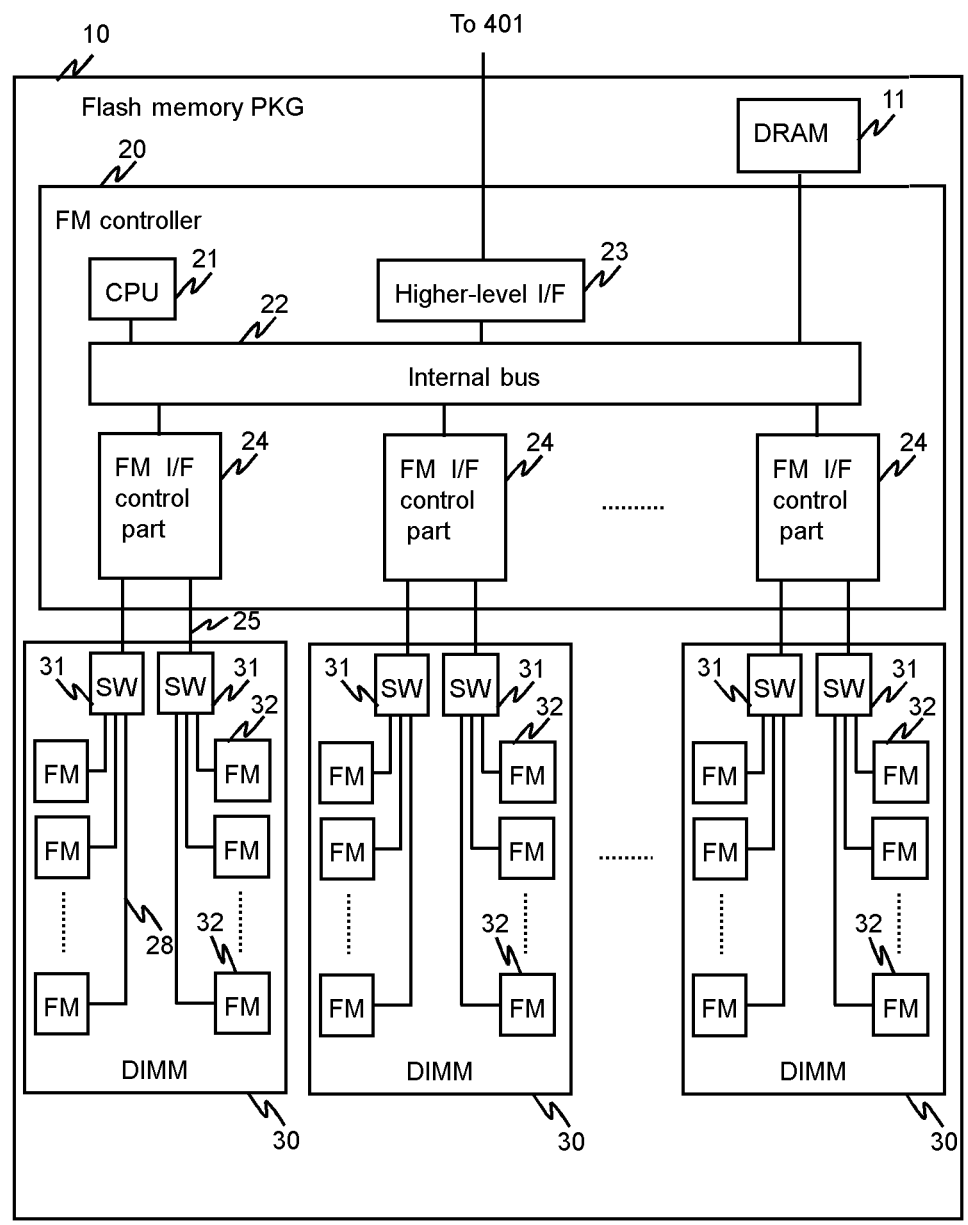
FIG. 3 shows a configuration of a flash memory package 10 related to the first embodiment.

A flash memory device 400, for example, comprises one or more flash memory packages (flash memory PKG) 10 as shown in FIG. 2. The flash memory PKG 10 comprises multiple flash memory chips (FM chip) 32 as shown in FIG. 3.

Figure 4:
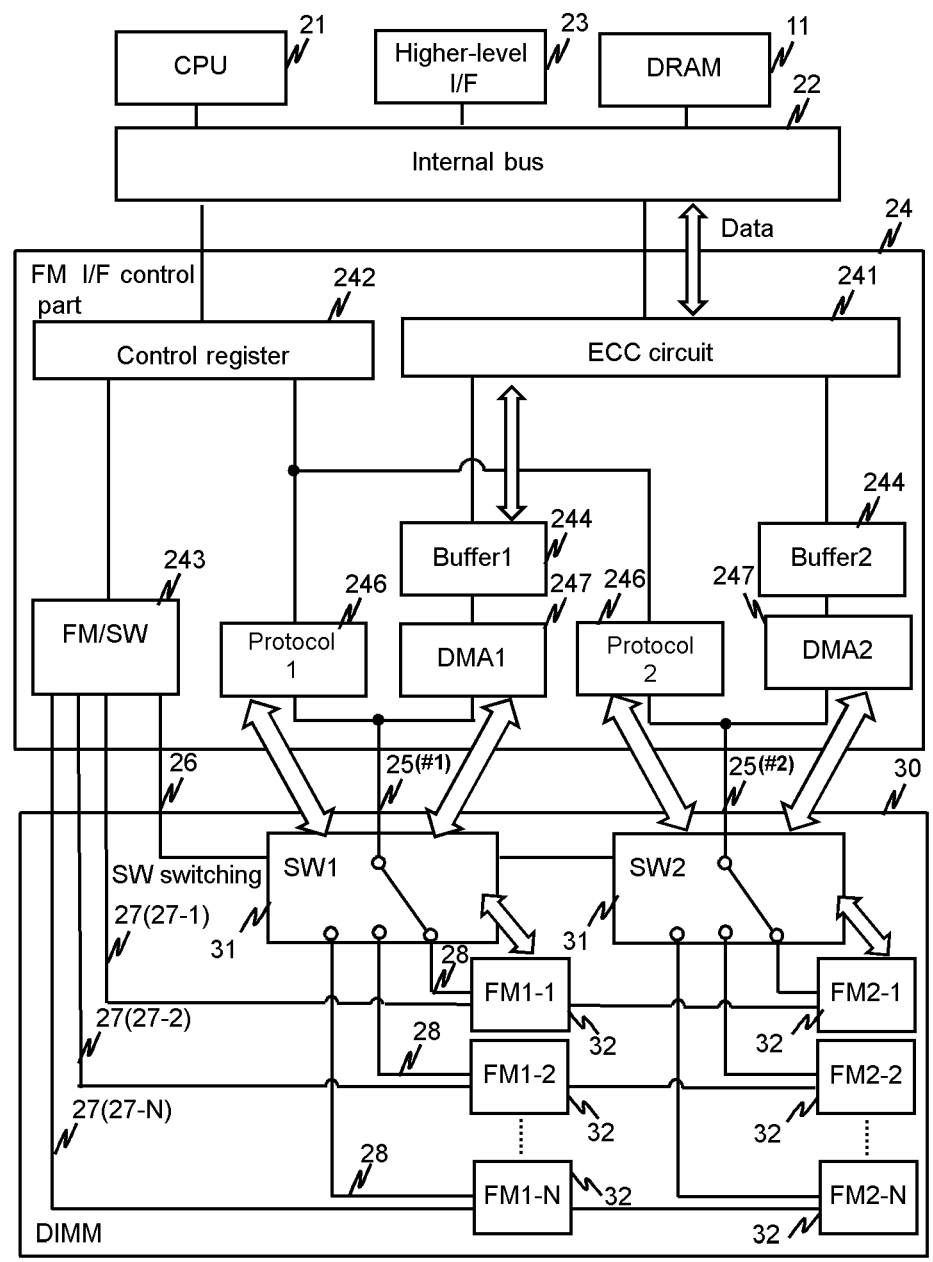
FIG. 4 shows a detailed configuration of a portion of a flash memory package 10 related to the first embodiment.

An FM I/F control part 24, which is an example of a media interface of the flash memory PKG 10, outputs to the FM chip 32 a chip enable signal (CE signal), data to be written to this FM chip 32, and the address that will serve as the write destination of this data. In this embodiment, as shown in FIG. 4, a signal line 27 of the CE signal, which is outputted from the FM I/F control part 24, is disposed so as to be coupled to multiple FM chips 32. In the FM I/F control part 24, since there may be one output terminal (pin) for one CE signal line 27, there may be fewer pins than there are FM chips 32.

Also, in this embodiment, as shown in FIG. 4, buses (bus: called a bus even though a control line is not included) 25, over which flow data, addresses or other such signals (signals other than the CE signal) outputted from the FM I/F control part 24, are respectively coupled to switches 31. Also, M (M being an integer of 2 or larger, for example, M=4) FM chips 32 are coupled to the switch 31 via a bus 28. The switch 31 is configured so as to switch the coupling between the bus 25 and any of the buses 28. Since data, addresses and the like are exchanged via the bus 25 in a read and write with respect to the FM chip 32, the pin to which the bus 25 is coupled may be reserved in the FM I/F control part 24. Furthermore, since any of multiple buses 28 is connected to the bus 25 using the switch 31, a state in which multiple buses 28 are electrically coupled does not occur.

In a logical space where a flash memory device 400 provides a higher-level apparatus (for example, a RAID controller 301 or a host 200), an address to specify the access location is called, logical address. A logical address, for example, is LPA (Logical Page Address). In a physical storage space where plural pages included in each of plural FM chips 32 configures, an address to specify the access location is called, physical address. A physical address, for example, is a PPA (Physical Page Address) of an FM chip. In order to store and manage a higher-apparatus data in the flash memory device 400, a logical address will be associated with a physical address (that is, a page of an FM chip 32). A logical-physical conversion table indicating which logical address corresponds with which page, for example, is stored in a storage area (for example, a DRAM 11) comprises an FM controller 20. Because an FM chip 32 is an NAND flash memory, there is a feature that a direct overwrite of the page data cannot be performed. Therefore, once the logical address data specified by the write command of the higher-level apparatus is updated, in most cases, a physical storage page of the data will be changed. Because of that, an association between a logical address and a physical address can change. Furthermore, the link might change following other facts.

Furthermore, a logical address (the first logical address) of which a RAID controller is specified by the host 200 and a logical address (the second logical address) of which a RAID controller specifies to a flash memory device 400 may be the same or different. In case they differ, in order to refer to which first logical address corresponds to which second logical address, a logical-logical conversion table, will be stored in, for example, a storage area which a RAID controller device 300 comprises.

Some embodiments will be explained in details below.

Embodiment 1

Figure 1:
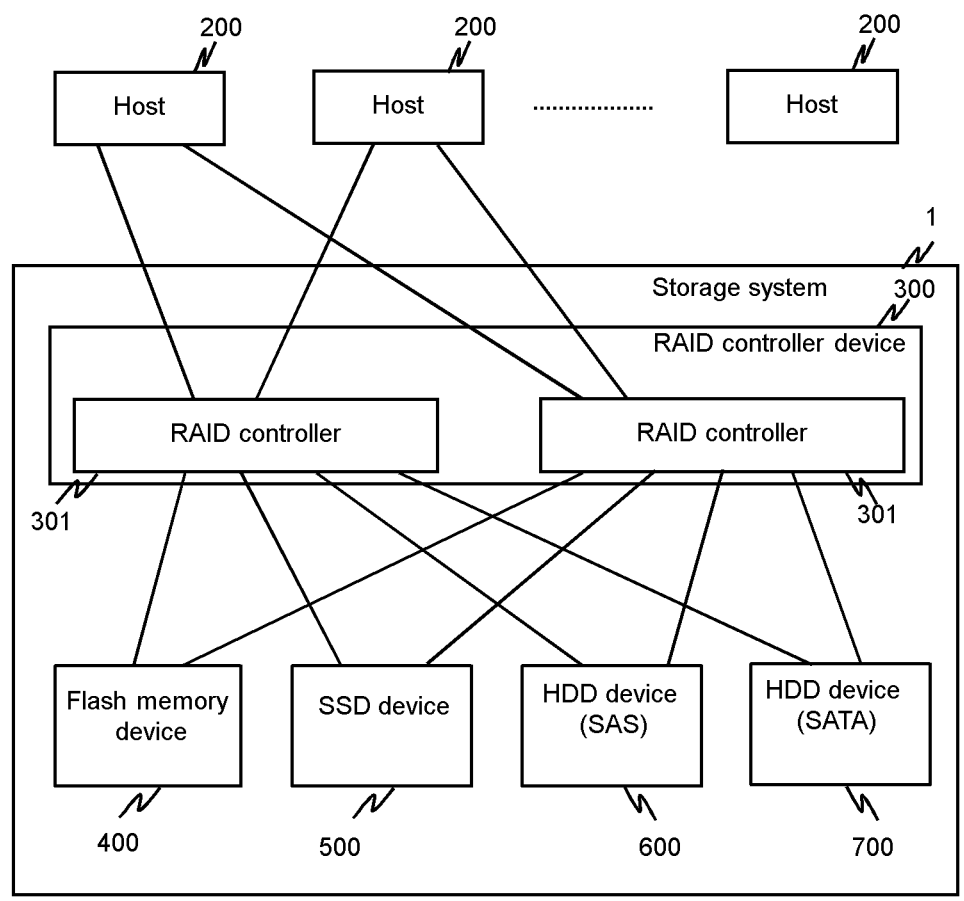
FIG. 1 shows a configuration of a computer system related to the first embodiment.

FIG. 1 shows a configuration of a computer system related to the first embodiment.

The computer system comprises a storage system 1 and a host computer (may also be called host) 200. The number of storage systems 1 and hosts 200 can both be one or more. The storage system 1 and the host 200 are coupled to one another via a communication network (for example, a SAN (Storage Area Network). The storage system 1 stores data that is used by the host 200. The host 200 executes various types of processing, reads data from the storage system 1, and writes data to the storage system 1.

The storage system 1 comprises multiple storage devices, and a RAID (abbreviation of Redundant Array of Independent (or Inexpensive) Disks) controller device 300, which is coupled to these multiple storage devices.

The multiple storage devices include multiple types of storage devices. One or more of at least one type of storage device may exist. The storage devices, for example, include a flash memory device 400, a SSD (Solid State Drive) device 500, a HDD (Hard Disk Drive) device (SAS: Serial Attached SCSI) 600, and a HDD device (SATA: Serial ATA) 700.

The RAID controller device 300 comprises multiple RAID controllers 301. Each RAID controller 301 is coupled via internal buses to the flash memory device 400, the SSD device 500, the HDD device (SAS) 600, and the HDD device (SATA) 700.

Furthermore, the RAID controller 301 is an example of a higher-level apparatus with respect to the flash memory device 400, the SSD device 500, the HDD device (SAS) 600, and the HDD device (SATA) 700. The RAID controller 301 receives an I/O command from a higher-level apparatus with respect to the RAID controller 301 (for example, the host 200), and performs access control to the flash memory device 400, the SSD device 500, the HDD device (SAS) 600, or the HDD device (SATA) 700 in accordance with this I/O command. The RAID controller 301 may perform processing for managing the respective storage areas of the flash memory device 400, the SSD device 500, the HDD device (SAS) 600, and the HDD device (SATA) 700 as respectively different storage tiers, and for allocating a storage area of any storage tier to the logical area that serves as the write-destination of the data.

FIG. 2 shows a configuration of a flash memory device 400 related to the first embodiment.

The flash memory device 400 comprises one or more higher-level I/F switches (higher-level I/F Switch) 401, and one or more flash memory packages (PKG) 10. The higher-level I/F switch 401 relays data between the RAID controller 301 and multiple flash memory PKGs 10.

FIG. 3 shows a configuration of a flash memory package 10 related to the first embodiment.

The flash memory PKG 10 comprises a DRAM (Dynamic Random Access Memory) 11 as an example of a main storage memory, and, in addition, comprises a FM controller 20, and multiple (or one) DIMM (Dual Inline Memory Module) 30. The DRAM 11 stores data and so forth used by the FM controller 20. The DRAM 11 may be installed in the FM controller 20, or may be installed in a different component than the FM controller 20.

The FM controller 20, for example, is configured using one ASIC (Application Specific Integrated Circuit), and comprises a CPU 21, an internal bus 22, a higher-level I/F (Interface) 23, and multiple (or one) FM I/F control part 24. The internal bus 22 is communicably coupled to the CPU 21, the higher-level I/F 23, the DRAM 11, and the FM I/F control part 24.

The higher-level I/F 23 is coupled to the higher-level I/F switch 401, and relays communications with a higher-level apparatus. The higher-level I/F 23, for example, is a SAS I/F. The FM I/F control part 24 relays data exchanges with multiple FM chips 32. In this embodiment, the FM I/F control part 24 comprises multiple combinations of buses (data buses and the like), which execute exchanges with a FM chip 32, and uses the multiple buses to relay data exchanges with multiple FM chips 32. In this embodiment, a FM I/F control part 24 is provided for each DIMM 30, and the FM I/F control part 24 relays the communication of multiple FM chips 32 of the DIMM 30 coupled to this control part 24. Furthermore, the FM I/F control part 24 may be in charge of two or more DIMM 30. The CPU 21 is able to execute various processing by executing a program stored in the DRAM 11 (or another storage area not shown in the drawing). There may be multiple CPUs 21, and the multiple CPUs 21 may share the various processing.

The DIMM 30 comprises one or more SW 31, and multiple FM chips 32. The FM chip 32 is a MLC type NAND flash memory chip.

The SW 31 is coupled to the FM I/F control part 24 via a bus 25 comprising a data bus. In this embodiment, the SW 31 is disposed so as to support one of a combination of buses 25 comprising a data bus coupled to the FM I/F control part 24. The SW 31 is coupled to multiple FM chips 32 via a bus 28 comprising a data bus. The SW 31 is configured so as to selectively couple the bus 25 from the FM I/F control part 24 to the bus 28 of any FM chip 32 in accordance with switching. Here, the SW 31 and multiple FM chips 32 are disposed and interconnected in the DIMM 30, thereby doing away with the need to provide other connectors for coupling these components.

Furthermore, according to FIG. 3, a FM chip 32 is coupled to the SW 31 without going through another FM chip 32, but a FM chip 32 may be coupled to the SW 31 by way of another FM chip 32. That is, two or more FM chips 32 may be coupled in series to the SW 31.

FIG. 4 shows a detailed configuration of a portion of a flash memory package 10 related to the first embodiment.

The FM I/F control part 24 comprises a ECC (Error Correcting Code) circuit 241, a control register 242, a FM/SW control part 243, a buffer 244, a FM bus protocol control part (depicted in the drawing as "protocol 1, protocol 2") 246, and a DMA (Direct Memory Access) part 247. In this embodiment, a number of combinations (for example, in the FIG. 4, two of the bus #1 and bus #2) of the buffer 244, the FM bus protocol control part 246, and the DMA part 247 is equivalent to the number of data buses with respect to which the FM I/F control part 24 is in charge.

In the DRAM 11, as will be described further below, write-target data is partitioned into multiple data elements. The ECC circuit 241 reads the write-target data elements from the DRAM 11, executes an error correcting process for generating an error correcting code corresponding (for example, added) to the write-target data elements, and writes the write-target data elements and the error correcting codes corresponding to these data elements to the buffer 244.

The ECC circuit 241 also reads data comprising a read-target data element and the error correcting code corresponding to this data element from the buffer 244, and uses the error correcting code corresponding to the data element to determine whether an error has occurred in the read-target data element. In a case where the result of this determination is affirmative, the ECC circuit 241 executes a process for correcting the error in the read-target data element. The ECC circuit 241 transfers the read-target corrected data to the DRAM 11.

In this embodiment, the ECC circuit 241 is in charge of error correcting code creation processing and error correcting processing for multiple FM chips 32 coupled to multiple data buses. Furthermore, there may be either one or multiple code creation circuit parts for executing the error correcting code creation process, and error correcting circuit parts for executing the error correcting process.

The control register 242 stores information required for controlling access to the FM chip 32. The information required for controlling access is for example CPU 21 controlling, and is configured by the FM bus protocol control part 246.

The FM/SW control part 243, in accordance with the control register 242 setting, outputs a signal (switching signal) for switching multiple SWs 26 of the DIMM 30 and a chip enable signal (CE signal) for selecting an access-target FM chip 32. In this embodiment, multiple CE signal lines 27 (27-1, 27-2, 27-3) and a signal line 26 for switching signal use (a switching signal line) shared by these CE signal lines 27 are coupled to the FM/SW control part 243. Each CE signal line 27 is coupled to different FM chips 32 subordinate to different SWs 31.

The switching signal line 26 coupled to the FM/SW control part 243 is coupled to multiple SWs 31 (SW 1, SW 2) of the DIMM 30. In accordance with this, the same switching signal is supplied to multiple SWs 31. For example, it is supposed that an FM chip 32 coupled to the same CE signal line 27 is coupled to the same number pin with respect to all of the multiple SWs 31 in the same DIMM 30. In accordance with this, in a case where these multiple SWs 31 receive the same switching signal, the coupling-destination of each SW 31 can be an FM chip 32 coupled to the same CE signal line 27. Therefore, it is possible to make the multiple FM chips 32 coupled to the same CE signal line 27 the write-destinations of multiple data elements, consequently making it possible to write these multiple data elements in parallel.

The CE signal line 27 coupled to the FM/SW control part 243 is coupled to multiple FM chips 32 for which multiple SWs 31 are in charge. N is, for example, 4. In this embodiment, the CE signal line 27-1 is coupled to FM #1-1 and FM #2-1, CE signal line 27-2 is coupled to FM #1-2 and FM #2-2, and, similarly, CE signal line 27-N is coupled to FM #1-N and FM #2-N. In accordance with this configuration, a CE signal is supplied substantially simultaneously to multiple FM chips 32 coupled to the same CE signal line 27. For this reason, these FM chips 32 can be operated in parallel substantially simultaneously. In this embodiment, when a switching signal is supplied, in SW #1 and #2, the buses comprising the data buses of the FM chips 32 coupled to the same CE signal line 27 are switched so as to be coupled to the FM I/F control part 24.

The buffer 244 temporarily stores a data element, which is targeted to be written to a FM chip 32, and the error correcting code thereof. The buffer 244 also temporarily stores a read-target data element, which has been read from the FM chip 32, and the error correcting code thereof.

The DMA 247 reads the write-target data element and error correcting code thereof stored in the buffer 244, and writes these to the FM chip 32. The DMA 247 also reads the read-target data element and the error correcting code thereof from the FM chip 32, and writes these to the buffer 244.

The FM bus protocol control part 246 issues (outputs) a command (a read command or a program command) to the FM chip 32 in accordance with the control register 242 setting. The FM bus protocol control part 246 also checks the FM chip 32 operation result (status) with respect to the command, and configures the operation result in the control register 242.

A data bus is coupled to the DMA 247, a command signal line is coupled to the FM bus protocol control part 246, and the bus 25, which comprises a data bus and a command signal line, is coupled to the SW 31.

The switching signal line 26 is coupled to the SW 31, and, in addition, the bus 25, which comprises a data bus, is coupled to the SW 31. In this embodiment, the same switching signal line 26 is coupled to the SWs #1 and #2. Also, the buses, which comprise data buses linked to multiple FM chips 32, are coupled to the SW 31. The SW 31 selectively couples any one of multiple buses 28 to the bus 25 on the basis of a switching signal supplied via the switching signal line 26. According to this SW 31, it becomes possible to access multiple FM chips 32 using a single bus 25. Also, since the SW 31 selectively couples any one of multiple buses 28 to the bus 25, the load capacity of the bus when sending a signal can be held in check, and signal quality can be maintained at a high level. In this embodiment, when the switching signal is supplied, switching is performed in the SWs #1 and #2 such that the bus 28, which comprises the data buses of the FM chips 32 coupled to the same CE signal line 27, is coupled to the bus 25 linked to the FM I/F control part 24.

Figure 5:
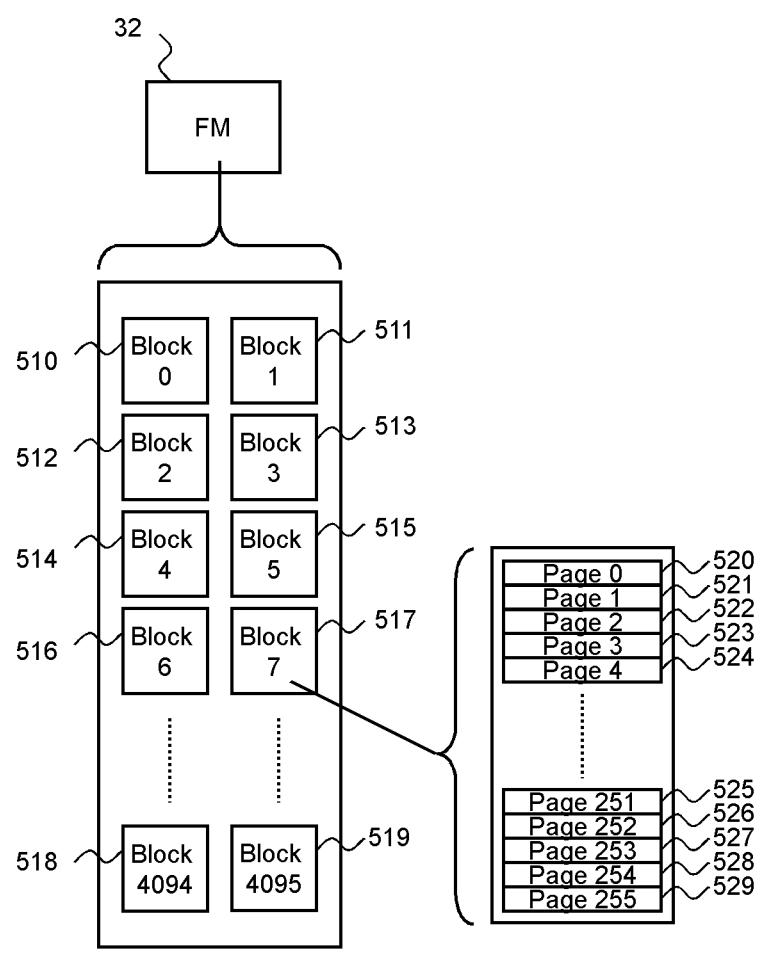
FIG. 5 shows a detailed configuration of a memory chip 32 related to the first embodiment.

FIG. 5 shows a detailed configuration of a memory chip 32 related to the first embodiment.

As shown in 510 to 519, an FM chip 32 has multiple "blocks" each of which is an erase unit of data. Its number is, for example, 4096. And, each block (for example, 517) has multiples "pages" each of which is a write unit of data. Its number is, for example, 256. One page capacity is, for example, 16 KB. As shown in 520 to 529, these pages have numbers from 0 to 255. For the 256 pages in each block of an FM chip 32, writing has to be done by numbers in ascending order from 0 to 255. This is defined as specifications of an FM chip 32. However, for example, there is a type of FM chip which is able to skip without writing pages in the middle regardless of ascending number as in case of writing the fourth page after the first page (for example, PTL 2). In this embodiment, a FM chip which is not allowed to skip a page is supposed to be adopted.

In the "page" which is a write unit of an FM chip 32, a data element of the data (referred to as write data) which is need to be written on the flash memory package 10, is written by the FM controller 20. The "write data" referred to here is typically a data (part or all of it) which the RAID controller 301 have received by the write command from the host 200. A process to write the data received from the host 200 to the FM chip 32 is supposed to be referred to as "host write process". The "write data" may be a valid data which migrates between the blocks, on the reclamation process, wear-leveling process and refresh process conducted by the FM controller 20 based on the internal state of the flash memory package 10.

A reclamation process, wear-leveling process and refresh process will be explained as follows.

First, a reclamation process is a process performed by the FM controller 20 in order to prevent having no free space on the FM chip 32 as the write process of a write command from the host 200 is performed. For more information, it is a process to select a first block including an invalid data (the data being old for having been updated), collect a valid data (a new data for not having been updated) from the first block, making all pages in the first block be invalid pages (making the first block be ready to be erased) by saving (writing) the valid data on the free pages of the second block, and erase the first block. Then, it is possible to increase the total number of free pages (recover a free space). This process, for example, will be executed as triggered by which the FM controller 20 detects the depletion of capacity. The depletion of capacity means that the number of free blocks (or free pages) has become less than the predetermined percentage (or predetermined number). Detection of capacity depletion may be performed in arbitrary unit, and may be detected per FM chip plurally mounted on some DIMM 30. The reclamation process is performed asynchronously with the write process of a write command from the host 200. The FM controller 20 selects the first block as a migration source block from the FM chip 32 which a free space is depleted. In addition, it selects the second block as a destination block. Here, it is desirable for the first block to be the block having the least valid pages (in other words, having the most invalid pages). This is because it can be expected that the total amount of valid data for migrating to the second block is needed least, and reduce the time for the reclamation process.

Then, the wear-leveling process is a process to perform in order to prolong a life as much as possible by equalizing the number of erase of the block configuring the FM chip 32. The FM controller 20 selects the first block whose number of times of erase is larger than the predetermined number of times (for example, twice the average number of times) and the second block whose number of times of erase is less than the predetermined number of times (for example, 0.5 times the average number of times), and migrates the valid page data in the first block to the free page of the second block. Thereby, it disables all pages in the first block ready to be erased, and erase the first block. The wear-leveling process is performed asynchronously with the write process of a write command from the host 200. A target block of the wear-leveling process is equivalent to the migration source block in the reclamation process. As well as the above-mentioned reclamation process, the FM controller 20 performs; (1) a determination of the destination block, (2) a migration of the valid data from the destination block to the source block, and (3) an erase process for the destination block.

Finally, the refresh process is a process to perform in order to conserve the valid data which is not given an opportunity to be migrated by the reclamation process for a long time. Generally, the electrical recording state of the memory cell of the FM chip 32 can possibly be destroyed by the impact of reading and writing of the peripheral memory cells, so if the page where the valid data is stored is left for a long time (for example, a few months), there is a risk that pieces of errors of which the error correction code cannot correct might occur and the data might be erased. Therefore, the FM controller 20 selects a block comprising a valid page based on the predetermined conditions, read the valid data, correct errors in the ECC circuit 241 and takes action to move to free pages of other blocks. Blocks to select may be, for example the blocks of which 30 days have passed since the last refresh process. Alternatively, FM controller 20 may perform a reading correction test of randomly selected valid pages, and select a block of which the number of errors corrected has passed the predetermined number, as a target block of the refresh process. The refresh process is performed asynchronously with the write process of a write command from the host 200. A target block of the refresh process is equivalent to the migration source block in the reclamation process. As well as the above-mentioned reclamation process, the FM controller 20 performs; (1) a determination of the destination block, (2) a transfer of the valid data from the migration source block to the migration destination block, and (3) an erase process for the migration source block.

On these 3 processes, a migration source block and a migration destination block may be in the same or different FM chip 32. Also, since these processes are performed asynchronously with the write process by the host 200, they will be referred to as asynchronous process collectively.

Figure 9:
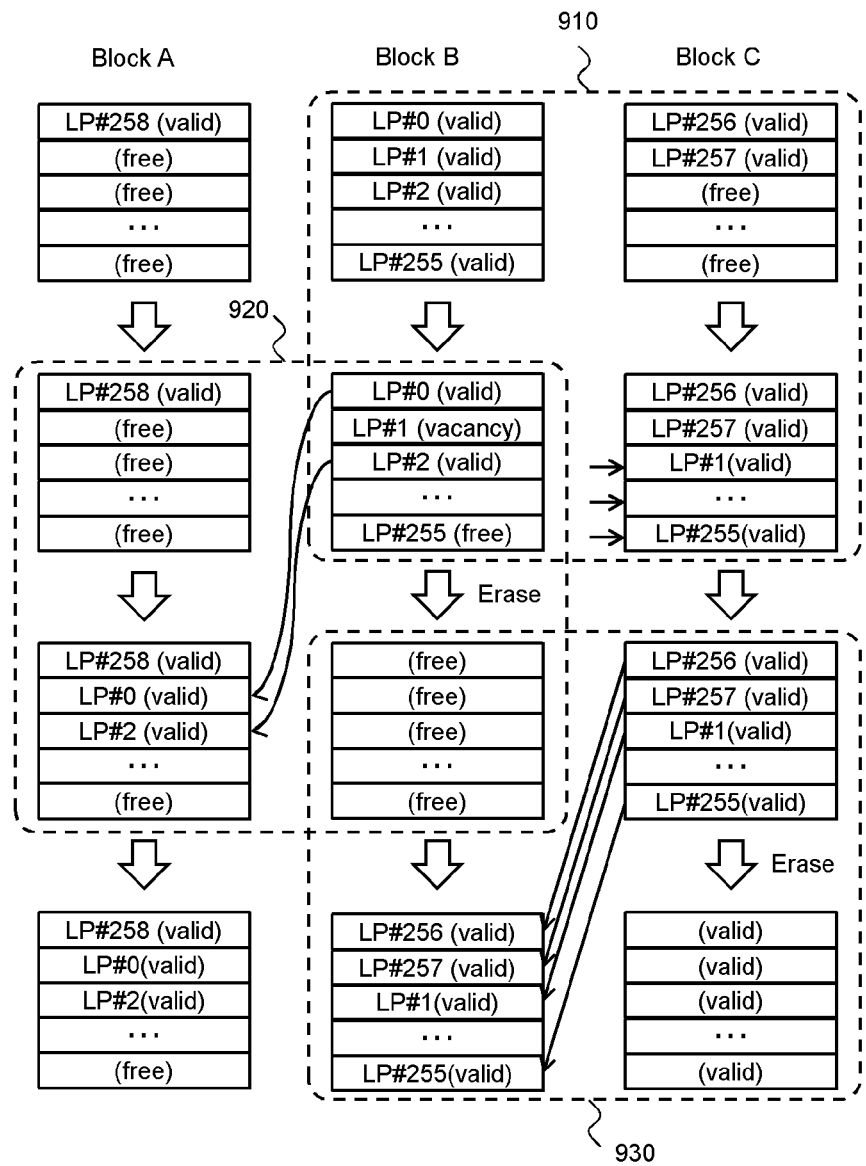
FIG. 9 shows an example of a state transition of blocks A to C as an example of a block related to the first embodiment.

FIG. 9 shows an example of a state transition of blocks A to C as an example of a block related to the first embodiment.

With reference to the FIG. 9, how the state of the blocks A to C changes by the above-mentioned host write process, reclamation process and refresh process, will be explained using examples. In the example shown in the FIG., the top state shown in the FIG. shows the initial state of each block A to C, and along the arrow, shows that the state of each block A to C transitions, and hereinafter, along the arrow, the state transitions to the second state, the third state and the fourth state.

In the example shown in the FIG., 768 physical pages sum of 3 blocks (physical blocks), A, B and C, and 259 logical addresses (LP (Logical Page) #0 to #258) are linked.

As an initial state, 1 valid data (LP#258) in the block A, 256 valid data (LP#0 to 255) in the block B, and 2 valid data (LP#256 and 257) in the block C, are stored, and the physical pages storing those valid data are valid pages. Also, the physical pages that are not used (in this embodiment, physical pages that are neither valid nor invalid) are free pages. Next, the host write process, reclamation process and refresh process will be explained.

<With Respect to the Host Write Process>

The dotted frame 910 shown in the FIG. shows the transition of the block B and C from the initial state to the second state.

On the initial state, a write command for 254 logical addresses (LP#1, #3 to 255) are supposedly received from the host 200.

On the second state, they will be written to 254 free pages of the block C. At this time, the 254 free pages in which the data from the host 200 of the block C is stored, will be invalid pages. Also, the FM controller 20 will disable the physical pages linked to the 254 logical addresses of the block B (LP#1, #3 to #255). In this manner, the host write process includes the process of changing the free pages to valid pages, and changing the valid pages to invalid pages.

<With Respect to The Reclamation Process>

The dotted frame 920 shown in the FIG. shows the transition of the block A and B from the second state to the third state.

On the second state, the largest number of invalid pages is included in the block B, and the block B is supposedly selected as a migration source block. Also, the block A is supposedly selected as a migration destination block.

On the third state, 2 valid data of the block B (logical address LP#0, LP#2) will be moved to the 2 free pages of the block A. At this time, the FM controller 20 changes the physical pages in which the 2 valid data of the block B (logical address LP#0, LP#2) has been stored into the invalid pates. Then, all pages of the block B will be invalid pages, so all data stored in the block B become erasable, and are able to be erased at a predetermined timing. As a result, all pages of the block B will be free pages. In this manner, the reclamation process is performed for the purpose of increasing the number of free pages (free physical blocks).

<With Respect to the Refresh Process>

The dotted frame 930 shown in the FIG. shows the transition of the block B and C from the third state to the fourth state.

On the third state, supposedly the valid data of the block C (LP#1, #3 to #257) is not updated for a long time, and the block C has been selected as a migration source block. Also, supposedly the block B has been selected as a migration destination block.

On the fourth state, the errors of the 256 valid data of the block C are corrected by the ECC circuit 241, and the 256 valid data of the block C will be migrated to each of the 256 free pages of the block B. At this time, all data stored in the block C become erasable, and will be erased by the FM controller 20. In this manner, the refresh process is performed for the purpose of conserving the valid data of which a long time has passed since the last write.

Next, with reference to the FIGS. 4 and 6, the process of writing the data element of the above-mentioned "write data" to the FM chip 32 (hereinafter, referred to as memory chip write process) will be explained.

In the FIG. 4, the CPU 21 of the FM controller 20 specifies the FM chip 32 of the write target before the memory chip write process, and performs a control setting to write the data element to the specified FM chip 32 for the control register 242 of the FM I/F control part 24. Also, the write data is stored in the DRAM 11 by the CPU 21. The CPU 21 of the FM controller 20 divides the write data in the DRAM 11 into the multiple elements (for example, 4, #0 to #3), and transfers those multiple data elements to multiple FM chips 32. The data element and error correction code is stored in a page of the FM chip 32.

First, the CPU 21 switches the SW#1, couples the FM chip #1-1 with the bus 25 left, and transfers the data element #0 to the FM chip #1-1 via the bus 25 left. The data element #0 will be written to the pages in the FM chip #1-1. Also, the CPU 21 switches the SW #2, couples the FM chip #2-1 with the bus 25 right, and transfers the data element #1 to the FM chip #2-1 via the bus 25 right. The data element #1 will be written to the pages in the FM chip #2-1. Furthermore, since the CE signal line 27 is shared by the multiple FM chips 32 (to be exact, multiple FM chips 32 coupled to different SW 31), the FM chip #1-1 and #2-1 asserts via the CE signal line 27-1 coupled to both the FM chip #1-1 and #2-1. As a result, the data element #0 and #1 can be written to the FM chip #1-1 and #2-1 in parallel.

Also, the CPU 21 switches the SW#1, transfers the data element #2 to the FM chip #1-2, switches the SW#2, and transfers the data element #3 to the FM chip #2-2. The FM chip #1-2 and #2-2 asserts via the CE signal line 27-2 coupled to both. As a result, the data element #2 and #3 can be written to the FM chip #1-2 and #2-2 in parallel.

In addition, on the above-mentioned process, the data element (for example, #0) on the DRAM 11 will be transferred to the buffer 244 (for example, #1) coupled to SW 31 (for example, #1) which is coupled with the FM chip 32 (for example, #1-1) of the data element destination. With the command from the CPU 21, the FM bus protocol control part 246 (for example, #1) activates the DMA 247 (for example, #1). The activated DMA 247 transfers the data element (for example, #0) in the buffer 244 (for example, #1) to the FM chip 32 (for example, #1-1) of the data element destination. Once the data element (for example, #0) is written to the FM chip 32 (for example, #1-1), a completion status will be sent to the FM bus protocol control part 246 (for example, #1) from the FM chip 32 (for example, #1-1). The FM bus protocol part 246 (for example, #1) will write the information showing that the completion status has been received, to the control register 242. By referring to the control register 242, the CPU 21 will know that the data element (for example, #0) has been written to the FM chip 32 (for example, #1-1).

In addition, on the above-mentioned process, when the FM chip #1-1 and #2-1 on the CE signal line 27-1 are busy writing the data element #0 and #1, the FM controller 20 may transfer the data element #2 and #3 to the FM chip #1-2 and #2-2 on the CE signal line 27-2, and start writing by negating the CE signal line 27-1 and asserting the CE signal line 27-2. As a result, the data element #0-#3 also can be written to the FM chip #1-1, #2-1, #1-2 and #2-2 in parallel. In this manner, the write data can be written efficiently.

Figure 6:
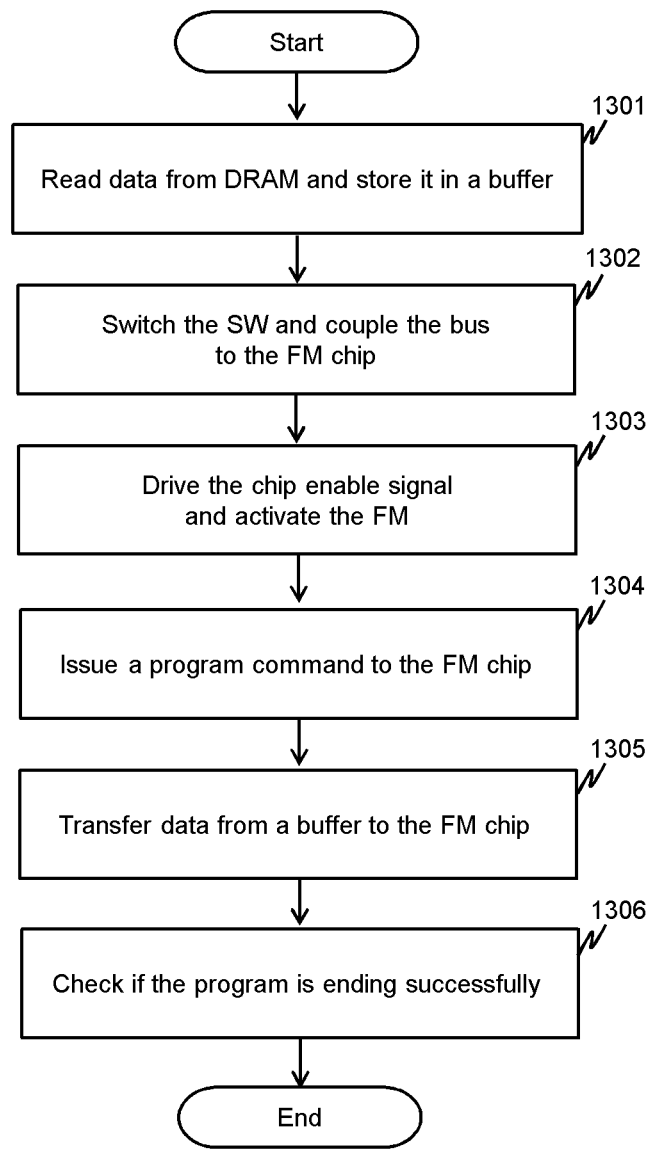
FIG. 6 shows a flow chart of a write process for a memory chip 32 related to the first embodiment.

FIG. 6 shows a flow chart of a memory chip write process related to the first embodiment.

The CPU 21 reads the data element of the write target from the DRAM 11, and passes the data element to the ECC circuit 241. The ECC circuit 241 creates an error correction code corresponding to the data element of the write target, and store the data which includes the data element of the write target and error correction code (here, referred to as write data on this process flow) to the buffer 244 (Step 1301).

Next, the FM/SW control part 243 sends the switch signal of the SW 31 using the signal line 26 in order for the bus 25 to be coupled to the write destination FM chip 32. As a result, the SW 31 switches the connection, and the write destination FM chip 32 is coupled to the bus 25 (Step 1302).

The FM/SW control part 243 drives the CE signal via the CE signal line 27 which leads to the write destination FM chip 32, and activate the write destination FM chip 32 (Step 1303). Next, the FM bus protocol control part 246 issues a program command (write command) via the bus 25 (Step 1304). As a result, the program command will be sent to the write destination FM chip 32 via the bus 25, SW 31 and bus 28. Subsequently, the DMA 247 reads the write data from the buffer 244, and transfers the data to the FM chip 32 (Step 1305).

Next, the FM bus protocol control part 246 obtains a status for a command from the FM chip 32, and store the status to the control register 242. The CPU 21 checks if the write has successfully been completed (Step 1306) by referring to the control register 242, and shuts the process if successfully completed.

The above is the flow of the memory chip write process.

With reference to the FIGS. 7A and 7B, the MLC memory cell semantics which is a storage element of the FM chip 32, and a memory cell array structure placing them on the grid will be explained.

Generally, a program semantics of a flash memory cell which is a storage element of the FM chip 32, comprises 2 a process to inject electrons to a floating gate for each flash memory cell included in the pages (memory cell transistor), and a process to verify whether each flash memory cell (memory cell transistor) has reached the intended threshold voltage or not thereby. The program semantics is executed repeatedly for the selected pages until each voltage level of all flash memory cells included in the selected pages within the predetermined number of times for the program to repeat, reaches the intended threshold voltage. In order to use the F-N tunneling (Fowler Nordheim Tunneling) effect and program to the flash memory cell, the predetermined program voltage should be applied to the flash memory cell gate, and the ground voltage or predetermined voltage should be applied to the flash memory cell channel. Then, a high electric field will be formed between the floating gate and channel of the flash memory cell. By this electric field, a tunneling which the electrons in the channel pass through an oxide film between the floating gate and channel, occurs and electrons will be stored in the floating gate of the flash memory cell. Accumulation of electrons to the floating gate raises the threshold voltage of the flash memory cell, and the predetermined data storage state for the flash memory cell will be programmed. In addition, once the supply voltage is applied to the flash memory cell, programming for the corresponding flash memory can be prevented.

Figure 7A:
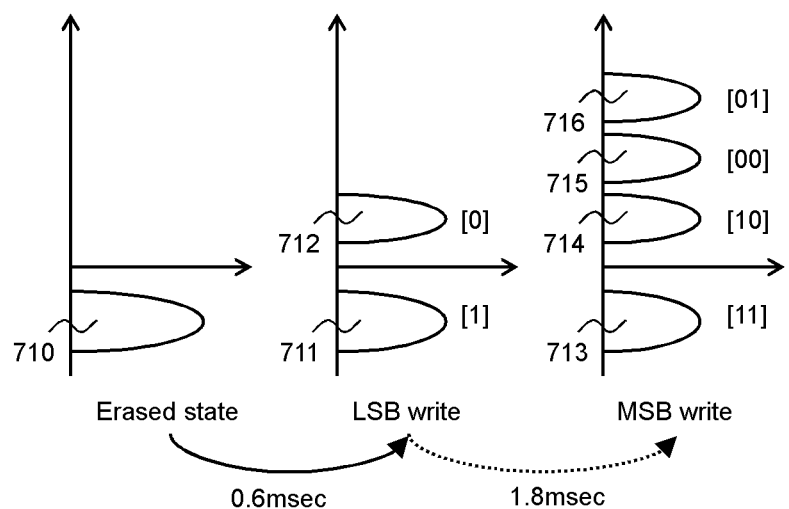
FIG. 7A shows a state transition of an MLC memory cell related to the first embodiment.

FIG. 7A shows a state transition of an MLC memory cell related to the first embodiment.

With reference to the FIG. 7A, a method to write a 2 bit value per cell for the MLC memory cell will be shown. In addition, the upper bit of the 2 bit for writing is referred to as MSB, the lower bit as LSB. The FIG. 7A shows the erase state of the MLC memory cell, the state after the LSB write and the state after the MSB write from the left to right, and shows the frequency distribution of the threshold voltage in each state.

Generally, the MSB write semantics takes a longer time than the LSB write semantics. For example, it takes 1.8 msec busy time, that is 3 times longer than that of the LSB write semantics.

The write semantics to write the 2 bit value is performed in 2 steps; the LSB write semantics to transition from the erase state of the MLC memory cell (710) to the state written to the LSB page, and the MSB write semantics to transition from the state to the state written to the MSB page as well.

First, the LSB write semantics considers the data storage state of the cell of the erase state (710) as [1] (711), and is a process to conduct a program to store [0] in the LSB page.

Once the LSB write semantics is performed from the state of the erase state (710), the data storage state of the programmed cell will transition to [0] (712), and the data storage state of the cell which has not been programmed, remains [1] (711). It will take the LSB write semantics, for example 0.6 msec busy time.

Next, the MSB write semantics detects the LSB write results of the cell, and is a process to conduct a program based on the value stored in the results and MSB. Once [1] is detected in the LSB page, the MSB write semantics considers the data storage state of the cell as [11] (713), and conducts a program if storing [0] in the MSB page is wished, and transitions the data storage state of the cell to [01] (716).

Also, on the MSB write semantics, if storing [1] in the MSB page is wished, the CPU 21 remains the data storage state of the cell [11] without conducting a program (713). On the other hand, if [0] is detected in the LSB page, CPU 21 considers the data storage state of the cell as [10] (714), and if storing [0] in the MSB page is wished, CPU 21 conducts a program, and transition the data storage state of the cell to [00] (715). If storing [1] in the MSB page is wished, CPU 21 does not conduct a program, and remain the data storage state of the cell [10] (714).

Figure 7B:
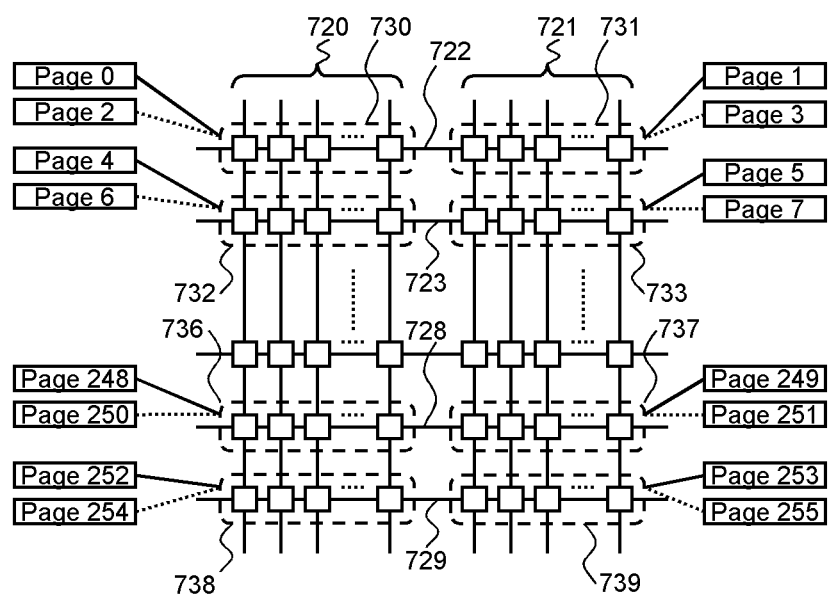
FIG. 7B shows a page mapping of an MLC memory cell array related to the first embodiment.

FIG. 7B shows a page mapping of an MLC memory cell array related to the first embodiment.

The MLC memory cell array shown in the FIG. 7B is an array of the MLC memory cell which configures one block of the FM chip 32. 4,096 arrays for the number of blocks are included in the FM chip 32.

The multiple signal lines drawn in the vertical direction (720 and 721) are bit lines of the MLC memory cell array, and the multiple signal lines drawn in the transverse direction (722, 723, 728 and 729) are word lines of the MLC memory cell array.

The MLC memory cell (indicated by square in the FIG. 7B) is placed at the position that each bit line and each word line intersect. One of the word lines can be asserted, and as for bit lines, either one set of the bit line group 720 or the bit line group 721 can be asserted.

For example, when the bit line group 720 and the bit line group 721 are asserted, the MLC memory cell group 730 will be selected, and those memory cells will be the access targets for reading and writing. Also, for example, when the bit line group 721 and the word line group 723 are asserted, the MLC memory cell group 733 will be selected, and those memory cells will be the access targets for reading and writing.

The number of bit lines which configure the bit line group (720 or 721) is 16,384×8=131,072 as a function of 16 KB which is a page size of the FM chip 32. Since each MLC memory cell group which comprise 131,072 (730, 731, 732, 733, 736, 737, 738, 739, etc) can record 2 bit value per cell as above, the physical capacity of each MLC memory cell group will be 2 pages. Since 2 MLC memory cell groups (for example, 730 and 731) exist on one word line, the possible pages which one word line can access will be 2 pages×2=4 pages. Since one block consists of 256 pages, the number of word lines is 256/4=64. Also, in one block, 64×2=128 MLC memory cell groups exist.

Next, a write destination page of the LSB write target data is referred to as LSB page, and a write destination page of the MSB write target data is referred to as MSB page to distinguish. For example, in one block, 128 LSB pages and 128 MSB pages are included. That is, each of 256 pages in one block is either an LSB page or an MSB page.

In addition, the page number of the page as the LSB page in a certain MLC memory cell group has to be a less number than the page number of the page as the MSB page in the MLC memory cell group. This, for example, is because the MSB write is performed after the LSB write as above.

In the FIG. 7B, such a requirement, that is, the page number which corresponds with the LSB page shows an example of mapping among the memory cell, the LSB page and MSB page, which is to be a smaller number than the page number corresponding with the MSB page.

In the example shown in the FIG., the page whose remainder is 0 or 1 of the page number of the page divided by 4 is the LSB page, and the page whose remainder is 2 or 3 of the page number of the page divided by 4 is the MSB page.

The solid line which links between the square with the page number written and the MLC memory cell group shows a correspondence of the memory cell to the LSB page. Also, the dotted line which links between the square with the page number written and the MLC memory cell group shows a correspondence of the memory cell to the MSB page. In such a page configuration, if the write of a page-by-page basis is conducted in page-number order for the blocks of the FM chip 32, the LSB write of which the processing time is short (hereinafter, referred to as fast LSB write) for the LSB page, and the MSB write of which the processing time is long (hereinafter, referred to as slow MSB write) will occur alternately every 2 pages inside the FM chip 32.

Generally, the information of where the free page is, is managed by tables, etc in each block which configures the FM chip. In the general flash memory device, when there is a write command from the host 200, a free page is searched based on the information regarding the free page, and the necessary number of pages is selected from the searched free pages, and the host write process of which the data is written in those free pages, is performed.

However, as above, in the MLC memory, depending on the page number of the write destination, the fast LSB write or the slow MSB write is performed. Ordinarily, since the host 200 cannot select the page number of the flash memory package 10 which is a write destination, a variability of the response performance which cannot be predicted will occur as in the response time of the host write process will be 0.6 msec with a probability of 50%, and 1.8 msec with a probability of 50%.

Figure 8:
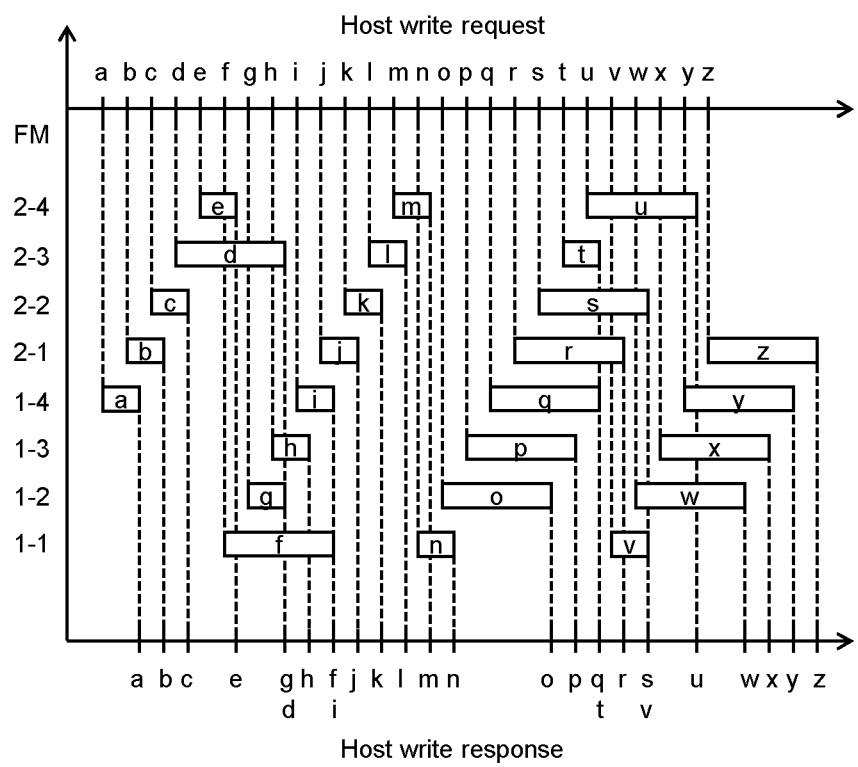
FIG. 8 shows an example of a host write process timing of a general flash memory device.

FIG. 8 shows an example of a host write process timing of a general flash memory device.

To simplify the explanation, it is assumed that the FM chip connection configuration on the general flash memory device is equal to the FM chip connection configuration of the embodiment shown in the FIG. 4 (except, N=4). As well as the embodiment, the multiple FM chips (8 chips of #1-1 to #1-4 and #2-1 to #2-4) can supposedly perform the memory chip write process in parallel.

Now, as shown in the horizontal axis at the top of FIG. 8, the flash memory package 10 has supposedly received 26 consecutive pages of the write command of one page unit from the host 200 at equal time intervals. The write data written in 26 pages is a to z respectively.

At this time, for example, when such a situation of which the data written in the 13 pages of a to c, e, g to n, t and v are allocated to the LSB page, and the data written in the 13 pages of d, f, o to s, u and w to z are allocated to the MSB page, occurs, each memory chip write process timing will be as shown in the FIG. 8. In addition, one end on the left of the square which includes each data shown in the FIG. 8, shows the point at which the write command has been received from the host 200, and one end on the right of the square shows the point of sending to the host 200 that the write command has been completed (host write response). That is, the data included in the square whose width is short, shows that the fast LSB write has been completed, and the data included in the square whose width is long, shows the slow MSB write has been completed.

For example, d is sent earlier than e for the flash memory package 10 from the host 200, but e has been completed earlier than d in writing. Also, the data is sent in the order of f, g and h, but g and h has been completed earlier than f in writing. In this manner, the order of write completion does not match the order of the write command. As a result, as the horizontal axis at the bottom of the FIG. 8 shows, the host write response will be sent to the host 200 in a different order from the order of the write command.

For example, on the host 200 side, in case the application of which it is important for the write command order to follow the order of the write command (to record the log information at regular intervals, etc), is running, this kind of unexpected response performance variability may lead to a performance degradation. As for the host 200, it is desirable for the write data to be allocated to the LSB page with high probability. If so, the host write response intervals will be equalized in the order of the write command, and the average response time will be shortened, so the application performance will improve.

And so, in the first embodiment, on the flash memory device equipped with the MLC memory, the FM controller 20 will allocate the LSB page to the write destination of the write data from the host 200 with high probability.

In particular, on the host write process, in case the FM controller 20 needs W pages as a write destination of the write data (W is a natural number), the FM controller 20 selects W physical blocks whose next write destination page is the LSB page, and write the write data to W first LSB pages (free pages) which respectively exist in the selected W physical blocks. In addition, here referred to as "next write destination page" refers to the next unused page of the terminal used page (typically, valid page) out of one or more used pages (valid page or invalid page), in other words, the first free page.

In this manner, in case the FM controller 20 needs the multiple pages as a write destination of the write data, the FM controller 20 enable the write destination of the write data to be the LSB pages by distributing the write destination of the write data to the multiple physical blocks each of which the next write destination page is the LSB page.

And, in order for the LSB page allocated as a write destination of the write data to avoid depletion (in order for the physical block whose write destination page is the LSB page, to avoid depletion), the FM controller 20 actively consumes the MSB page upon writing on a different process from the host write process, and enables the next write destination page to create a physical block whose next write destination page is the LSB page. The process which is different from the host write process and in which the data write is performed, is typically a process such as the above-mentioned reclamation process or the refresh process, that is, an asynchronous process which is started without receiving commands from the host 200. On the asynchronous process, the FM controller 20 selects the physical block whose next write destination is the MSB page, and write the data to the selected physical block. As a write destination, the multiple pages are needed, and in case the multiple MSB pages are continuous on the selected physical block, the FM controller 20 may write data to the continuous multiple MSB pages on the same physical block until the next write destination page becomes the LSB page. In case the next write destination page becomes the LSB page before finishing writing the data, the FM controller 20 may select another physical block whose next write destination page is the MSB page, and write the remaining data to the selected physical block.

As above, due to reason that MSB page is actively consumed on the asynchronous process, only the LSB page can be allocated to the write destination of the write data from the host 200 out of MSB pages and LSB pages with high probability on the host write process.

In order to perform a control as above, out of the multiple blocks configuring the multiple FM chips 32 installed in the flash memory package 10, the CPU 21 of the FM controller 20 manages the information of how many blocks are included in which FM chip 32 on which bus 25 regarding the blocks whose first free page (the next write destination page) is the LSB page, and the numbers of those blocks. In particular, the CPU 21 creates the three types of tables shown in the FIG. 10A to 10C on the DRAM 11, and manages them.

Figure 10A:
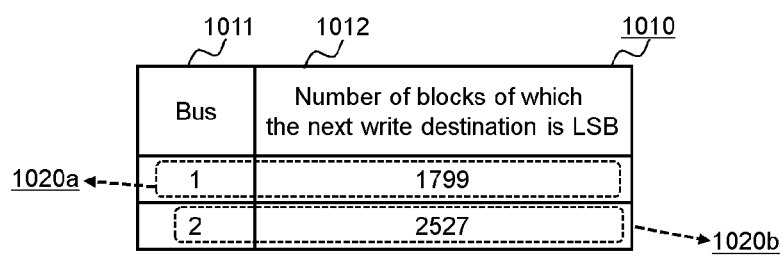
FIG. 10A shows an LSB page management table 1010 related to the first embodiment.

FIG. 10A shows an LSB page management table 1010 related to the first embodiment.

The table 1010 is a table which exists per DIMM 30, and for example, is created on the DRAM 11 by the CPU 21. This table 1010 comprises the bus 1011 and the number of blocks

1020 whose next write destination is the LSB block per bus 25 on the corresponding DIMM 30 (the DIMM 30 which corresponds to this table 1010).

The bus 1011 shows the number of the bus 25 included in the corresponding DIMM 30.

The number of the blocks 1012 whose next write destination is the LSB shows the total number of the blocks whose next write destination is the LSB page out of the blocks included in the multiple FM chips 32 coupled to the bus 25.

As above, the LSB page and MSB page which configure the blocks are mixed in the block (for example, exist alternately). If the LSB page is used for a certain write process, there is a case that there is no choice but to write to the MSB page. However, for example, the data from the host 200 which fast response speed is required, is not wished to be written to the MSB page as much as possible. Therefore, in the embodiment, by managing the block whose next write destination page is the LSB page, it is possible to write the data from the host 200 to the LSB page on a priority basis.

FIG. 10B shows an LSB page management table 1020 related to the first embodiment.

The table 1020 (1020a, 1020b) is a table which exists per bus 25, and for example, is created on the DRAM 11 by the CPU 21. For example, in the example shown in the FIG. 4, since there are 2 buses 25 per DIMM 30, 2 tables 1020 exist per DIMM 30. In the FIG. 10B, the table 1020a on the left is the corresponding table to the bus #1, and the table 1020b on the left is the corresponding table to the bus #2 (See the FIG. 10A)

The table 1020 comprises the FM chip 1021 (1021a, 1021b) and the number of the blocks 1022 (1022a, 1022b) whose next write destination is the LSB per FM chip coupled to the corresponding bus 25 (the corresponding bus to the table 1020).

The FM chip 1021 shows the number of the FM chip 32.

The number of blocks 1022 whose next write destination is the LSB shows the total number of blocks whose next write destination page is the LSB page included in the FM chip.

FIG. 10C shows an LSB page management table 1030 related to the first embodiment.

The table 1030 is a table which exists per FM chip, and for example, is created on the DRAM 11 by the CPU 21. The table 1030 in the FIG. 10C, for example, shows a table related to the FM chip of the FM chip 1021 [FM 2-3] (See the FIG. 10B).

This table 1030 comprises the block 1031, the next write 1032 and the page type 1033 per physical block included in the corresponding FM chip (the FM chip which corresponds to this table 1030).

The block 1031 shows the number of the physical block.

The next write 1032 shows the page number of the next write destination page.

The page type 1033 shows the page type (either LSB page or MSB page) of the next write destination page. However, like the block #4094, as for the block written to the last page, since the next write page does not exist, the next write 1032 and page type 1033 are managed as "none" in this table 1030.

Figure 11:
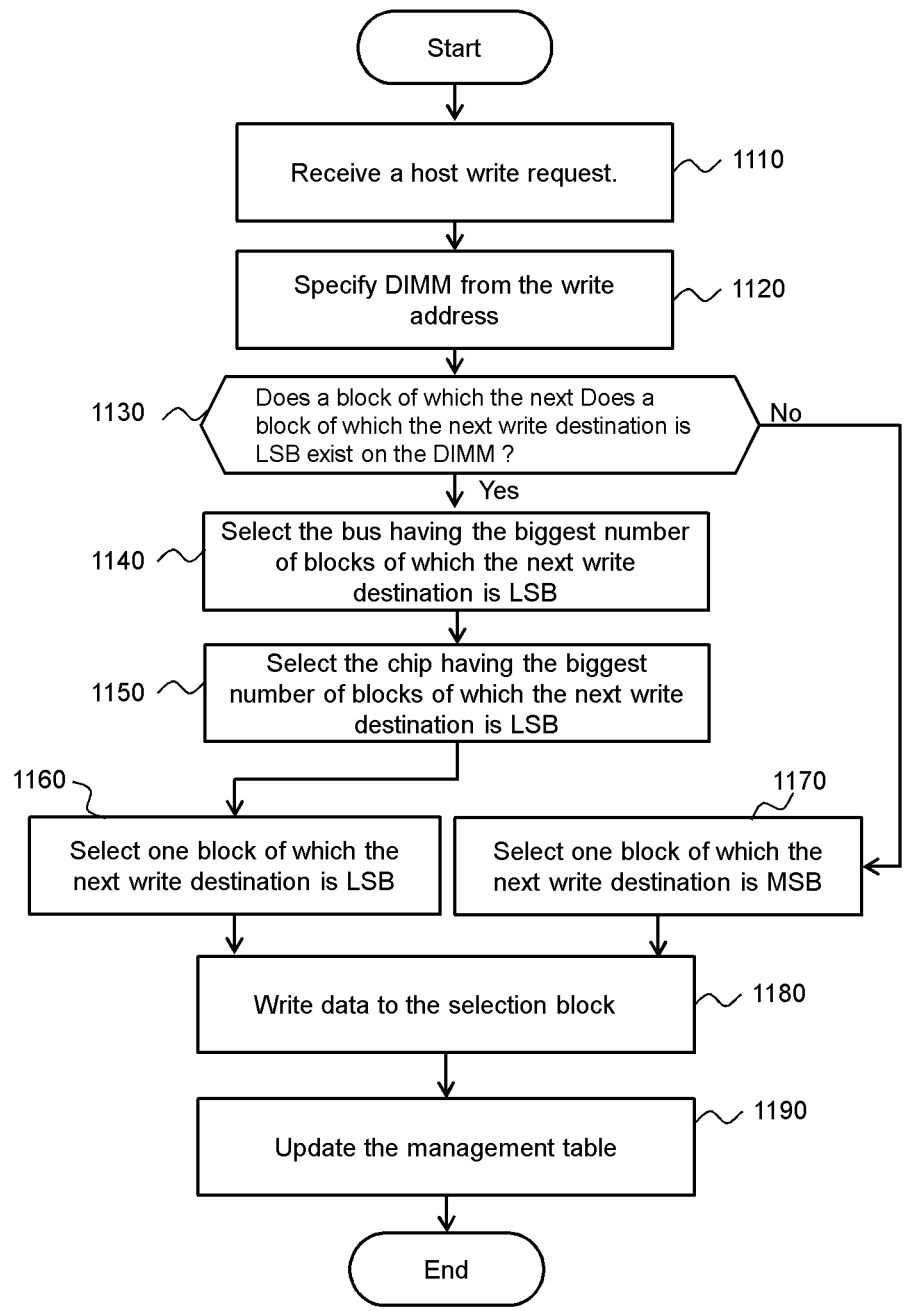
FIG. 11 shows a flow chart of a host write process related to the first embodiment.

FIG. 11 shows a flow chart of a host write process related to the first embodiment.

With reference to the FIG. 11, the process of which the CPU 21 of the FM controller writes one of the multiple data elements of which the write data from the host 200 is divided into a page-by-page basis, to the free page of the FM chip 32 will be explained in details.

First, the FM controller 20 receives a write command from the host 200 (Step 1110).

Then, the CPU 21 specifies the write destination logical address included in the write command, and specifies the DIMM 30 which corresponds to the write destination logical address (Step 1120). That is, in the embodiment, for example, the multiple DIMMs 30 are respectively mapped with the multiple logical address ranges, and the CPU 21 specifies the DIMM 30 which corresponds to the logical address range belonged to the write destination logical address. Furthermore, the DIMM 30 to be specified may be the selected DIMM 30 randomly, and may be the DIMM 30 which fits the predetermined condition. The DIMM 30 which fits the predetermined condition may be, for example, the DIMM with the biggest total number of the blocks 1012 whose next write destination is the LSB, or the DIMM coupled to the bus with biggest number of the blocks whose next write destination is the LSB.

Next, the CPU 21 refers to the LSB management table 1010 which corresponds to the DIMM 30 specified at the step 1120, and based on the values 1020 (the number of blocks 1012 whose next write destination is the LSB) in each row on the table 1010, judges whether the FM chip 32 whose next write destination page includes the LSB page block, is coupled to at least one bus coupled to the DIMM specified at the step 1120 or not (Step 1130). In particular, if all values 1012 are "0" on the referred LSB page management tale 1010, the judgment results of the step 1130 will be negative, and if at least one value 1012 on the referred LSB page management table 1010 is larger than "0", the judgment results of the step 1130 will be positive. In addition, thinking stochastically, it is considered that the possibility, of which all of the values 1012 are "0", is fairly low.

If the judgment results of the step 1130 are false (Step 1130: No), the CPU 21 selects one block whose next write destination is MSB page (Step 1170).

And, the CPU 21 writes a data element (all or part of the write data) to the first free page (MSB page) selected at step 1170 (Step 1180), and updates the table 1010, 1020 and 1030 (Step 1190). At step 1190, for example, in case the next write page becomes the LSB page on the selected block at step 1170 by writing a data element to the MSB page at step 1180, the CPU 21 changes the page type 1033 of the page type 1033 shown by the next write 1032 of the table 1030, to "LSB", and also, increment the number of blocks 1012 and 1022 whose next write of the table 1010 and 1020 is LSB, by one.

On the other hand, if the judgment results of the step 1130 are true (Step 1130: Yes), the CPU 21 refers to the LSB page management table 1010, and for example, selects the most abundant bus 1011 whose number of the blocks 1012 of the next write destination is LSB (for example, according to the FIG. 10A, bus #2) (Step 1140).

Next, the CPU 21 refers to the table 1020 which corresponds to the selected bus #2 at step 1140, and selects the FM chip 1021 having the most abundant number of blocks 1022 whose next write destination is the LSB (for example, according to the FIG. 10B, FM chip #2-3 on the table 1020b) (Step 1150).

The CPU 21 refers to the table 1030 which corresponds to the selected FM chip #2-3 at step 1150, and selects one block (according to the FIG. 10C, block #2) whose next write 1032 is the LSB page (Step 1160).

The CPU 21 writes a data element (a part or all of the write data) to the first free page (LSB page) #105 of the selected block #2 at step 1160 (Step 1180). After that, the CPU 21 performs a process of step 1190. In particular, the CPU 21 updates the number of the blocks 1012, 1022, next write 1032 and the page type 1033 whose next write destination is the LSB depending on the next write page of the block which the data element is written to (for example, the page 106 of the block #2), becomes either the LSB page or MSB page at step 1190.

With the completion of step 1190, the host write process ends.

The above is the flow of the host write process.

In the above host write process, the bus 25 and FM chip 32 with the biggest number of the blocks whose next write destination page is the LSB page, is selected on a priority basis.

Therefore, it is expected that the number of the blocks 1012 and 1022 (1022*a* and 1022*b*) whose next write destination is the LSB will decrease while being leveled.

In case a large amount of the write data is received from the host 200, in order to process a large amount of data elements dividing that as soon as possible, it is desirable to perform the LSB write to all FM chip 32 blocks in parallel.

If the number of the blocks 1012 and 1022 (1022*a* and 1022*b*) whose next write destination is the LSB, is not leveled (that is, a degree of variability in the number of the LSB pages between the blocks is big, or the LSB page is biased to some buses or FM chips), there is a high probability that the FM chip 32 which the block whose next write destination page is the LSB page, does not exist, occurs. In other words, it is supposed that the MSB write is performed in some FM chips 32, and since the LSB write cannot be performed to all FM chip 32 blocks in parallel, the write response performance cannot be maintained at a high state.

In this manner, according to the block selection method of the host write process based on the LSB page management table 1010, 1020 and 1030, the number of the blocks 1012 and 1022 whose next write destination is the LSB are leveled, so there is a higher chance of being able to perform the LSB write to all FM chip 32 blocks in parallel and the host write response performance (response performance for the write command from the host 200) is maintained at a high state.

Figure 12:
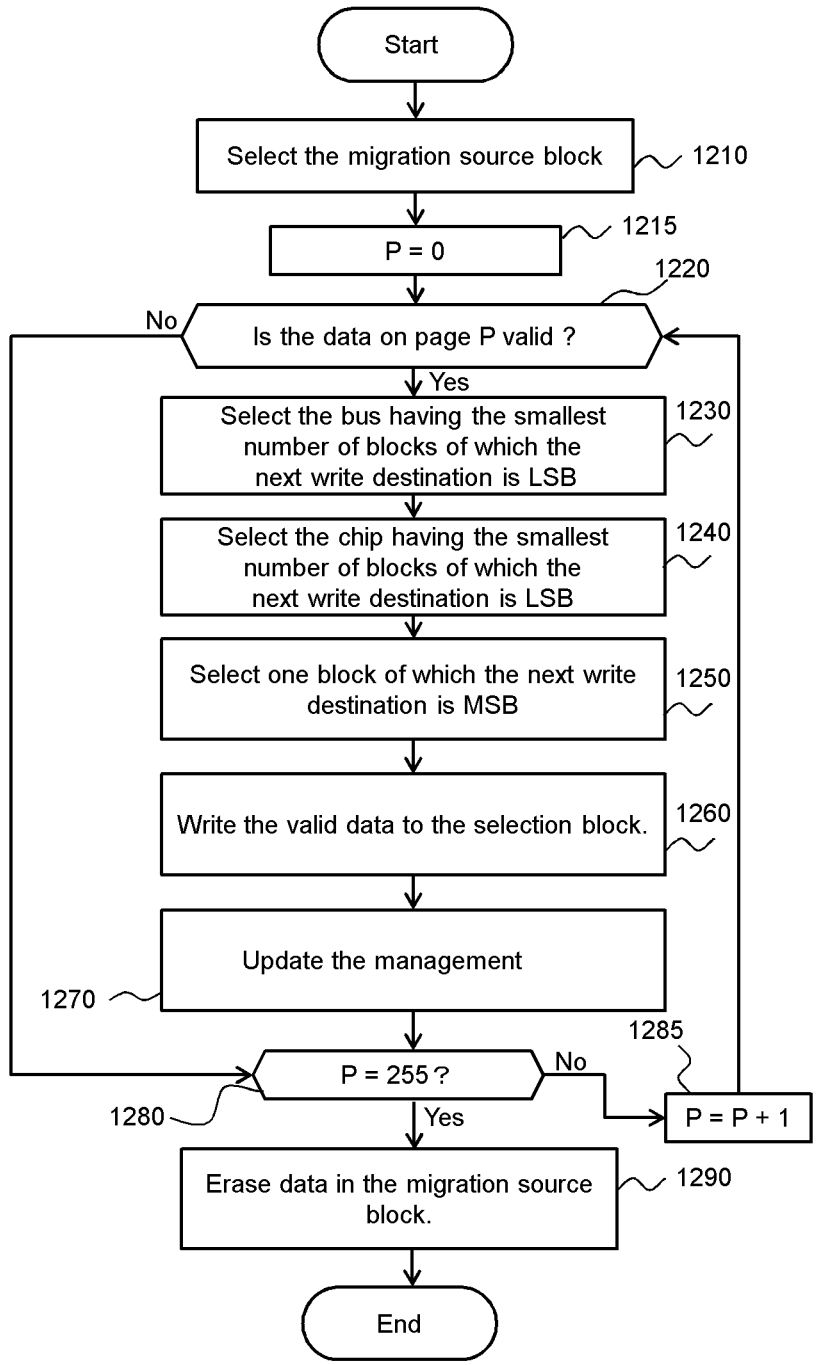
FIG. 12 shows a flow chart of an asynchronous process related to the first embodiment.

FIG. 12 shows a flow chart of an asynchronous process related to the first embodiment.

With reference to the FIG. 12, an asynchronous process which the CPU 21 of the FM controller 20 performs asynchronously with the host write process will be explained in detail.

First, on the particular DIMM 30, when the CPU 21 of the FM controller 20 determines that there is a need to perform the reclamation process, wear-leveling process or refresh process based on the predetermined conditions as mentioned above (See the FIG. 9), the CPU 21 selects the migration source block being a target for migrating the data in accordance with the given conditions by each process (Step 1210).

And, in order to check the migration source blocks in order, the CPU 21 transitions the process of step 1220 by initializing the page number P to 0 (Step 1215).

In step 1220, the CPU 21 judges whether the page P of the migration source block is valid or not.

If the judgment results of step 1220 are false (step 1220: No), the CPU 21 performs the process of step 1280.

If the judgment results of step 1220 are true (step 1220: Yes), the CPU 21 refers to the table 1010 which corresponds to the DIMM 30, and selects the bus 1011 with the least block whose next write destination is the LSB page (for example, according to the FIG. 10A, bus #1) (Step 1240).

The CPU 21 refers to the table 103 which corresponds to the selected FM chip #1-2 at step 1240, and selects one block whose next write destination is the MSB page (for example, according to the FIG. 10C, block #4093) as a migration destination block (Step 1250).

The CPU 21 writes the valid data in the migration source block to the first free page (MSB page) of the selected migration destination block #4093 at step 1250 (Step 1260).

And, the CPU 21 updates each entry of 1010, 1020 and 1030 (Step 1270) depending on the next write page (for example, the page 24 of the block #4093) of the migration destination block in which the valid data is written, becomes the LSB page or MSB page, and performs the process of step 1280.

In step 1280, the CPU 21 judges whether the page P is 255 or not (that is, whether all pages in the migration source block are checked or not).

If the judgment results of step 1280 are false (step 1280: No), the CPU 21 adds 1 to the page number P (Step 1285), and performs the process of step 1220.

On the other hand, if the judgment results of step 1280 are true (step 1280: Yes), the CPU 21 erases the data in the source block since source block pages have become all invalid (Step 1290).

With completion of step 1290, the asynchronous process ends.

The above is the flow of the asynchronous process.

In the asynchronous process above, the FM controller 20 selects the blocks which belong to the bus 25 and FM chip 32 with abundant blocks whose next write destination page is the MSB page, as the migration destination blocks on a priority basis, and changes the migration destination blocks to the ones whose next write destination page is the LSB page, by writing the valid data in the source blocks to the first free page (MSB page) of the selected blocks. In a case where the migration destination block are the block which the MSB page and LSB page are arranged alternately, the migration destination block is the block whose next write destination page is the LSB page by which the valid data is written to the MSB page with the first free page.

According to the above explanation, the number of the blocks whose next write destination page is the LSB page, declines by being appropriated to the write destination block of the host write process, but according to the selection method of destination block of the above-mentioned asynchronous process, it is possible to increase the blocks whose next write destination is the LSB page. That is, it is possible to maintain the host write response performance at a high state.

In addition, according to the destination block selection method of the asynchronous process related to the first embodiment, the value whose next write of the table 1010, 1020 is the LSB blocks 1012, 1022 (1022*a*, 1022*b*) are leveled.

For this reason, the host write response performance can be maintained at a high state for the same reasoning as the block selection method of the host write process flow.

Figure 13:
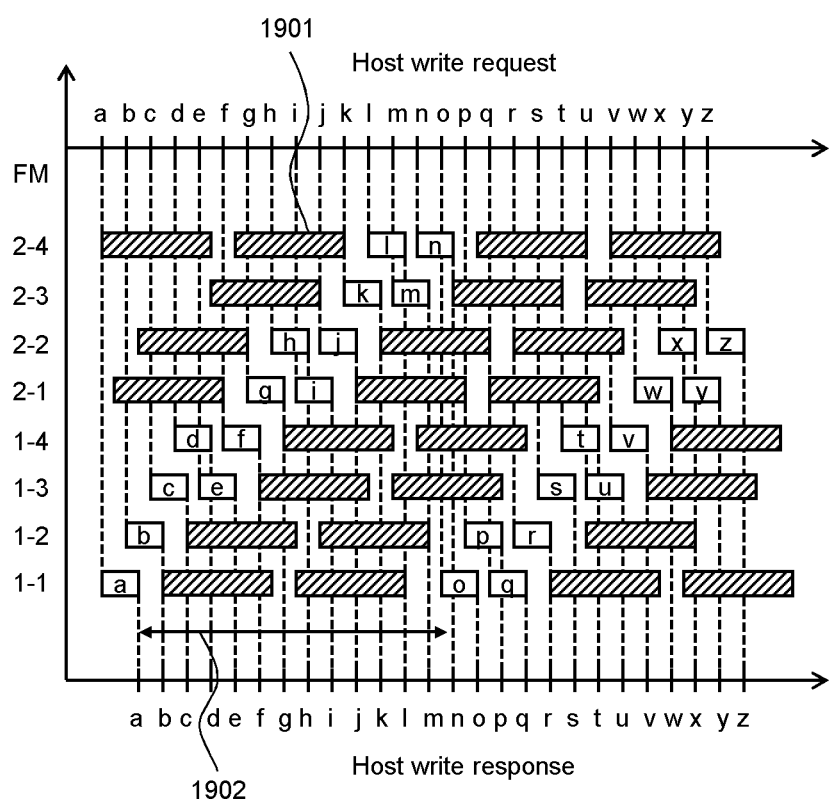
FIG. 13 shows an example of a host write process timing related to the first embodiment.

FIG. 13 shows an example of a host write process timing related to the first embodiment.

With reference to the FIG. 13, it is explained that the response performance of the host write process is maintained at a high state by the first embodiment. In addition, in this example, on the FM chip connection configuration shown in the FIG. 4, it is assumed that K=4 (K is the number of the FM chips coupled to the bus 25). For this reason, it is assumed that the multiple FM chips (8 chips of #1-1 to #1-4 and #2-1 to #2-4) can conduct the memory chip write process in parallel.

As the horizontal axis at the top of the FIG. 13 shows, the write command of a page basis from the host 200 is supposedly received 26 pages continuously at equal time intervals. The write data of the 26 pages is a to z respectively.

In the FIG. 13, the time shown by the white square of each FM chip 32 shows the time for LSB writing (write to the LSB page) the host data (write data from the host). Also, the time shown by the square with oblique line (for example, 1901) shows the time for MSB writing (write to the MSB page) the valid data of migrating target on the asynchronous process. If the LSB write frequency and the MSB write frequency of migrating data are the same extent, on each FM chip 32, it is possible to maintain the number of the blocks (the number of the blocks 1012 whose next write of the table 1020 is the LSB) whose next write destination page is the LSB page, without decreasing. By this, the 26-page-host data of a to z are all allocated to the LSB page. As a result, as the horizontal axis at the bottom of the FIG. 13 shows, it is possible to send the host write response to the host 200 at equal time intervals.

Furthermore, in the above explanation, in order to make the LSB frequency of the host data and the MSB write frequency of the migrating data, the same or similar extent, in the example shown in the FIG., on each FM chip 32, it is a necessary condition for the time which the host data is not LSB written to the FM chip 32 (for example, 1902) to be equal to or more than twice the time of the MSB write. For a certain reception frequency of the write command, the larger the N on the connection configuration of the FM chip 32, the less the number of the host write data which one FM chip 32 processes per unit time, becomes, so the time 1902 becomes longer. Therefore, on the flash memory package 10 related to the first embodiment, at the design stage, in case a designer determines the reception frequency of the necessary host write command. And the value of K (the number of FM 32 coupled to the bus 25) is determined so that, in a case where the write of the host data is performed at the determined reception frequency of the host write command, the time which the host data is not LSB written can be equal to or more than twice the time of the time needed for the MSB write. The value of K may be determined by a person or the CPU 21.

As above, according to the first embodiment, the host write response speed of the flash memory package 10 is maintained at a high state.

With this, the explanation of the first embodiment ends.
Embodiment 2

Next, the second embodiment is explained. In that regard, the difference from the first embodiment is mainly explained, and the explanation of the common point with the first embodiment is abbreviated or simplified.

In the first embodiment, if there is an LSB page in the flash memory package 10, the data from the host can be written to the LSB page. However, on a specific DIMM 30, in case there is no necessity to perform the asynchronous process (reclamation process, wear-leveling process, refresh process), and/or there is no LSB page, there is a necessity to write the data from the host 200 to the MSB page.

In the second embodiment, the CPU 21 performs mainly the following two processes. In addition, in the following explanation, dummy data write is referred to as "dummy write".

(*) On the asynchronous process (for example, reclamation process, wear-leveling process or refresh process), the CPU 21 performs lossless compression to the valid data and writes to the MSB page of the migration destination block.

(*) The CPU 21 writes the dummy data to the MSB page of the migration destination block.

In the second embodiment, by these 2 processes, it is possible to mitigate the consumption of the storage area of the migration destination block, and also increase the number of the blocks whose next write destination is the LSB page.

Figure 14:
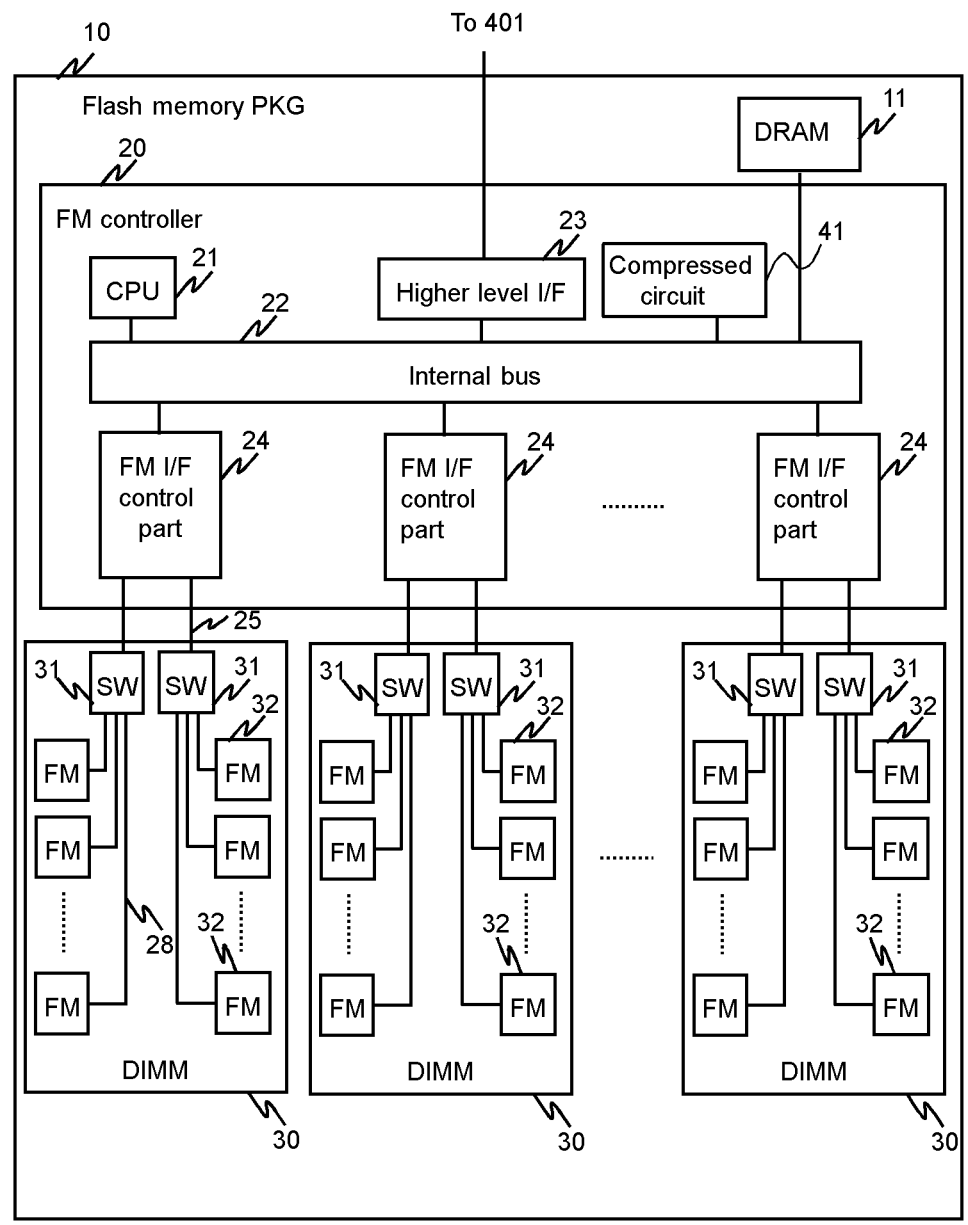
FIG. 14 shows a configuration of a flash memory package 10 related to the second embodiment.

The FIG. 14 shows the configuration of the memory package 10 related to the second embodiment.

As shown in the FIG. 14, the flash memory package of this present embodiment is the same configuration as the flash memory package 10 of the FIG. 4 on the first embodiment which has been explained so far except for one point. The different point is that a compression circuit 41 is equipped in the internal FM controller 20. The compression circuit 41 is a logical operation circuit coupled to the internal bus 22. When the stored data in the DRAM 11 is inputted to the compression circuit 41 via internal bus 22, the data is compressed by the lossless compression algorithm, and the compression data is created, and that is inputted to the DRAM 11 via the internal bus 22. The compressed data size is equal to or less than the size of the original data. The lossless compression algorithm is, for example, the Deflate algorithm defined by RFC (Request for Comments). In general, most of the document file data are by this algorithm, for example, compressed to equal to or less than half of the data size. Due to the lossless compression, the compressed data can restore the data before compression by extending. In addition, the compression circuit 41 also comprises a circuit to perform an extension process of extending the compressed data. When the compressed data stored in the DRAM 11 is inputted to the compression circuit 41 via the internal bus 22, the compression circuit 41 restores the original data by extending the compressed data, and input that to the DRAM 11 via bus 22. These compression, extension processes by the compression circuit 41 is controlled by the CPU 21 of the FM controller 20.

On the flash memory package 10, if the lossless compression technique is applied, for example, it is possible to store the data comprises the physical page of X pieces in the physical page of Y pieces which is less than X pieces. Here, the value referred to as (X-Y) is the number of the physical pages which is no longer needed to allocate to the physical pages by data compression.

Such a sum of all numbers of the physical pages occurred by conducting data compression, is defined as the number of margin pages. And, in order to manage it, the margin page counter per DIMM 30 is equipped in the DRAM 11 of the flash memory package 10. The margin page counter is, for example, shown in the FIG. 15B (referential mark 1510).

On this present embodiment, if the counter value of the margin page counter 1510 on a certain DIMM 30 is equal to or larger than the predetermined value (for example, 300 pages), the CPU 21 determines that it is a state that the physical pages are sufficient surplus in the multiple FM chips 32 on the DIMM 30. And, if determined in that manner, the CPU 21 writes the dummy data to the block whose next write destination page is the MSB page, and changes the block to the block whose next write destination page is the LSB page. This process is referred to as a dummy write process. In addition, the dummy data, for example, is all 0 data, all 1 data, or random data, and are the meaningless data which does not correspond with any logical address. Also, the CPU 21 may conduct the dummy write process after returning the response of the host write process to the host 200, and also may conduct asynchronously with the host write process.

Figure 15:
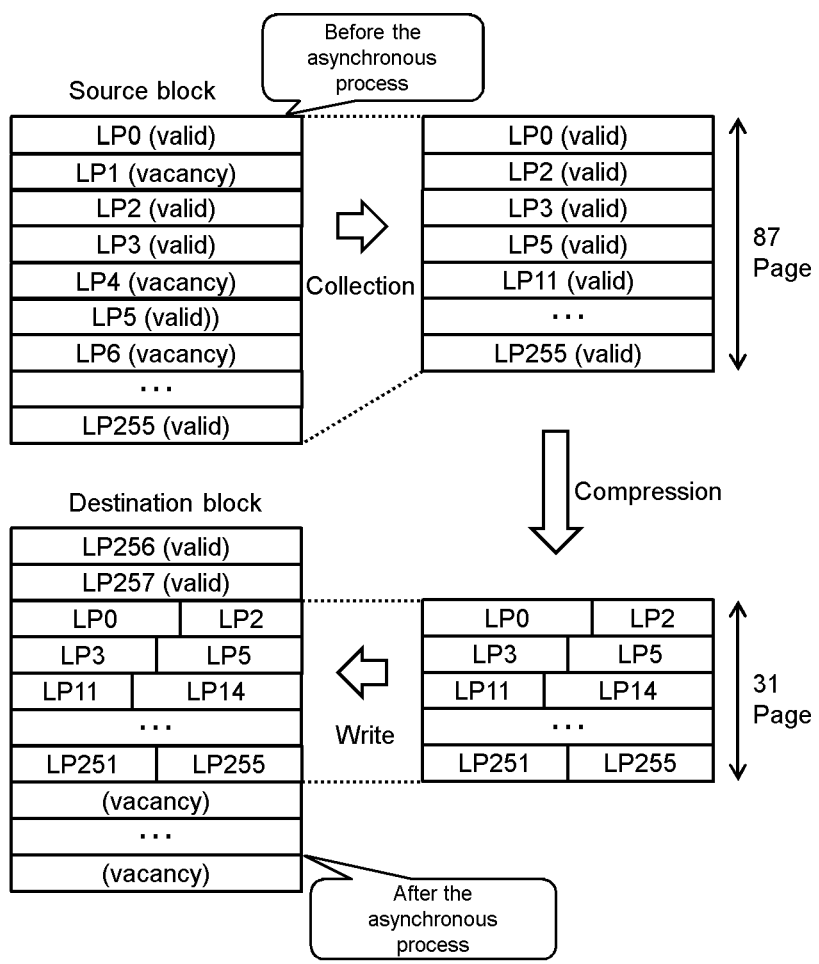
FIG. 15A shows an example of a dummy write process related to the second embodiment.
FIG. 15B shows an example of adding of a margin page counter 1510 related to the second embodiment.

The FIG. 15A shows an example of the asynchronous process related to the second embodiment. The FIG. 15B shows an example (an example of which the margin page is added) of the margin page counter 1510 related to the second embodiment.

With reference to the FIGS. 15A and 15B, in order to increase the value of the margin page of the margin page counter 1510, an example of the asynchronous process which the data compression is applied, will be explained. The margin page counter 1510 may exist in a given unit (for example, per flash memory package, per DIMM, per bus or per FM chip).

The margin page counter comprises the number of the margin pages before update 1511, variation 1512, and the number of the margin pages after update 1513.

The number of the margin pages 1511 before update shows the number of the margin pages before the asynchronous process.

The number of the margin pages 1513 after update shows the number of the margin pages after the asynchronous process. The variation 1512 shows the subtracted value shown by the number of the margin pages 1511 before update from the value shown by the number of the margin pages after update, that is, the number of the margin pages (saved physical pages as a write destination) occurred by the asynchronous process.

In the present embodiment, the host write process is conducted as well as the first embodiment. This follows the same flow as the FIG. 11. Also, in the present embodiment, as well as the first embodiment, three types of asynchronous processes (reclamation process, wear-leveling process, refresh process) are conducted asynchronously with the host write process. These follow the different flow from the FIG. 12. The detail will be mentioned later.

In the present embodiment, suppose the selected source block by the asynchronous process contains 87 valid pages out of 256 pages as in the FIG. 15A. The CPU 21 reads the valid data on the DRAM 11 from these valid pages. And, the CPU 21 conducts the lossless compression process on those valid data by using the compression circuit 41, and compresses the valid data for the 87 pages (87 pieces of valid data) to the valid data for 31 pages, and writes the compressed valid data on the DRAM 11. The CPU 21 moves (writes) the compressed valid data to the 31 free pages of the destination block. Since the valid data for the 87 pages have been compressed to the valid data for the 31 pages, 56 (=87-31) physical pages in the destination block have been supposedly saved.

As shown in the FIGS. 15A and 15B, in case the number of the margin pages 1511 before update is 473 pages, the CPU 21 has saved (in other words, has created 56 margin pages) 56 pages of physical pages to be consumed by the above-mentioned data compression, so it will update the variation 1512 to "+56 pages", and update the number of the pages 1513 after update to "529 pages" (=473+56).

Figure 16:
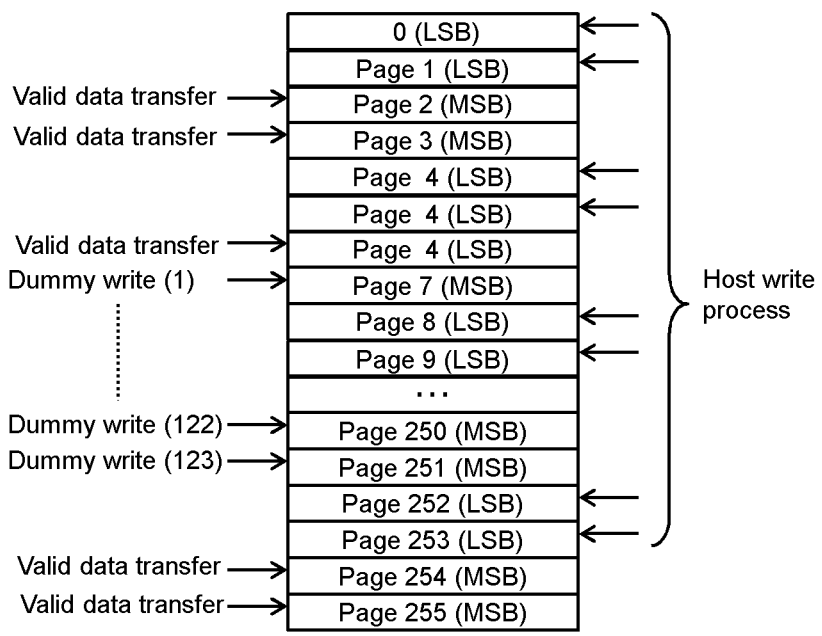
FIG. 16A shows an example of a dummy write process related to the second embodiment.
FIG. 16B shows an example of adding of a margin page counter 1610 related to the second embodiment.

FIG. 16A shows an example of a dummy write process related to the second embodiment. FIG. 16B shows an example of a margin page counter 1610 (an example of which the margin page is subtracted) related to the second embodiment.

With reference to the FIGS. 16A and 16B, an example of a situation which the number of the margin pages of the margin page counter 1610 decreases by the dummy write process, will be explained.

The FIG. 16A shows an example of writing the migrating data and dummy data of the asynchronous process to the 128 MSB pages in order to write 128 data elements (a part of the host data) to the 126 LSB pages out of 256 pages which configure one certain block on the FM chip 32.

In case there is no migrating data at the point of which the migrating data of the first asynchronous process has written to the page 6, while much of the host write process is occurring, the CPU 21 writes the dummy data to the 123 MSB pages from page 7 to 251 until the second asynchronous process begins, and after that write the migrating data of the second asynchronous process from the page 254.

In this manner, if writing the dummy data to the MSB pages is performed in order to replenish the MSB write by the above 3 types of asynchronous process, it is possible to supply the block whose next write destination is the LSB page for the host write process at a higher probability.

In case the margin counter value before the dummy write process is 529 pages, as the margin page counter 1610 shows in the FIG. 16B, since the physical pages for the 123 pages will be consumed from the number of the margin pages 1611"529 pages" before update, the CPU 21 updates the number of the margin pages 1613 after update to "406 pages (=529-123)".

In addition, writing the dummy data is nothing but waste the physical pages of the FM chip 32, but by the asynchronous process which applies the data compression, it is possible to maintain the margin page counter value at more than predetermined value. Therefore, on the DIMM 30, it is supposed that the demand balance of the total number of the physical pages for the total number of the logical pages is reasonably maintained, so the acceleration of the write performance decline or lifetime degradation can be avoided.

Figure 17:
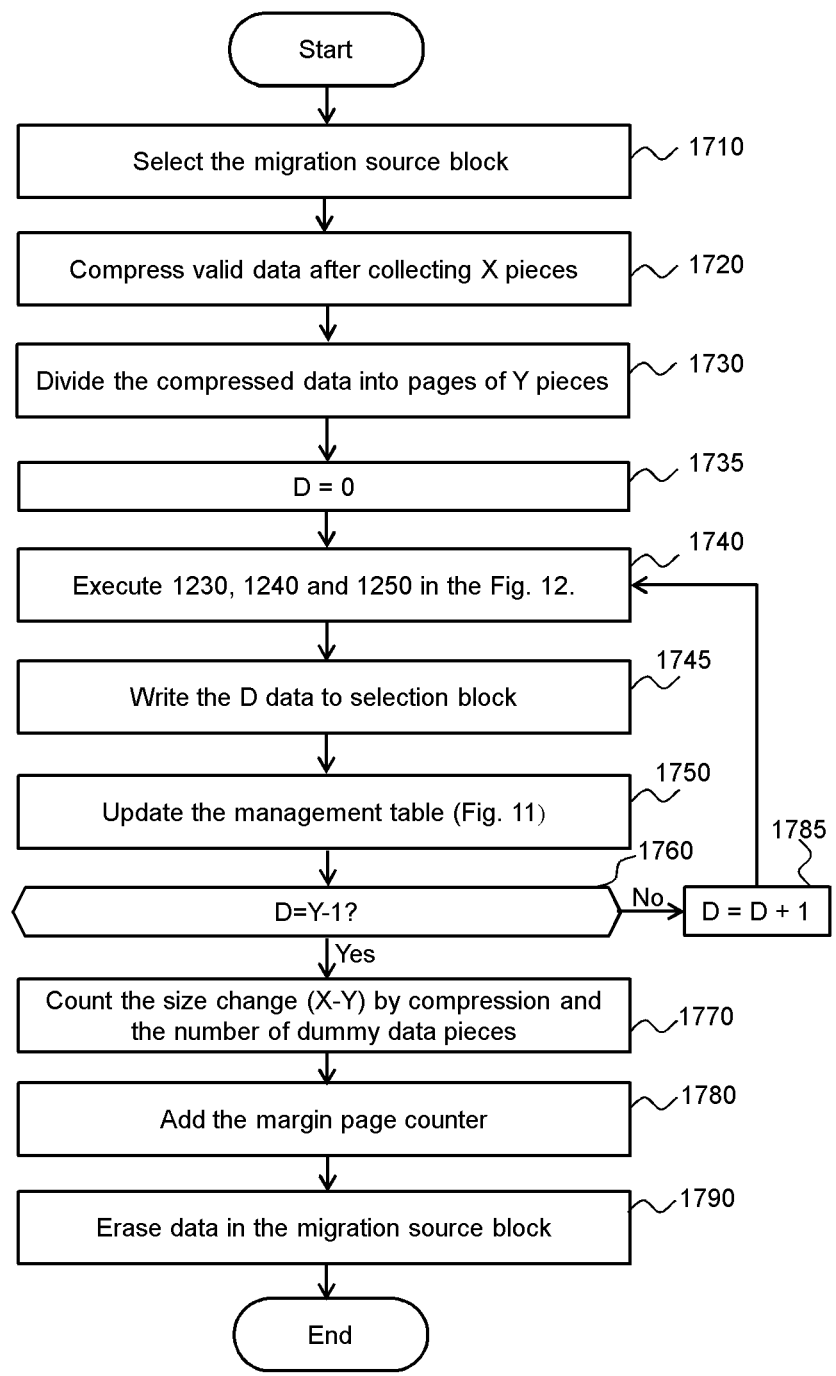
FIG. 17 shows a flow chart of an asynchronous process related to the second embodiment.

FIG. 17 shows a flow chart of an asynchronous process related to the second embodiment.

With reference to the FIG. 17, the procedures of the asynchronous process conducted asynchronously with the host write process on this present embodiment will be explained.

First, the CPU 21 of the FM controller 20 judges a necessity to conduct the reclamation process, wear-leveling process or refresh process on a certain DIMM 30, and selects the migration source block (Step 1710).

And, the CPU 21 specifies the valid page from the 256 pages of the migration source block (suppose the number of the page is X), and reads the valid data recorded in there to the DRAM 11, and after compressing the compression circuit 41, it retains the recompressed valid data to the DRAM 11 (Step 1720).

Next, the CPU 21 divides the compressed valid data into a page-by-page basis (Step 1730). Suppose the number of the divided data is Y. At this time, Y is equal to or less than X.

Next, the CPU 21 initializes the dividing page number D to 0 (Step 1735), and performs the process of step 1740.

On step 1740, by using the table 1010, 1020 and 1030 (See the FIG. 10A, 10 and 10C), in accordance with the same procedures as the step 1230, 1240 and 1250 of the asynchronous process flow in the FIG. 12, the CPU 21 selects one block whose next write destination page is the LSB page as a migration destination block, out of the FM chips 32 coupled to the bus 25 with the least block whose next write destination page is the LSB page.

The CPU 21 writes the No. D dividing data of the compression data to the free page (MSB page) of the selected destination block (Step 1745).

Depending on the next write destination page of the migration block in which the dividing data is written becomes the LSB page or the MSB page, the CPU 21 updates the table 1010, 1020 and 1030 (Step 1750).

The CPU 21 judges whether the dividing page No. D is Y-1 (the last diving data) or not (Step 1760).

If the judgment results of the step 1760 are false (step 1760: No), the CPU 21 adds 1 to the dividing page No. D (Step 1785), and transitions to step 1740.

If the judgment results of the step 1760 are true (step 1760: Yes), the CPU 21 counts the size variation ((X-Y) page) of the valid data by compression. Furthermore, if there is a page in which the above-mentioned dummy data is written, in the 256 pages of the migration source block, the CPU 21 counts the total number of the page (suppose Z page) (Step 1770).

<With Regard to Step 1770>

The margin pages increase when the valid data is compressed and written at the time of the asynchronous process, but they decrease when the dummy data is written to the MSB pages. That is, in a case where there is dummy data in the migration source block, it is not the valid data which the margin page has been wasted. In a case where the dummy data exists in the migration source block, it is desirable for the CPU 21 to increase the margin pages only for the number of dummy data existing in the source block in addition to compressing the migration source data. For that reason, on step 1770, the CPU 21 counts the total number of the dummy data (Z) of the source block, along with the number of the compressed pages (Y) in order to count the margin pages.

The CPU 21 adds (X−Y+Z) pages to the margin page counter (Step 1780). This means that the space of the physical pages for the (X-Y) pages has been newly created by compression, and the wasted margin pages by writing the dummy data to the source block in the past have been collected here.

Finally, the CPU 21 erases data in the migration source block (Step 1790).

With the completion of step 1790, the asynchronous process ends.

The above is the flow of the asynchronous process on the second embodiment.

In this manner, in this present embodiment, by the asynchronous process, since the number of the margin pages 1511 and 1611 before update on the margin page counter 1510 and 1610 is added along with which the valid data is compressed and written to the destination block, the number of the physical pages to be consumed by writing dummy data can be replenished.

Figure 18:
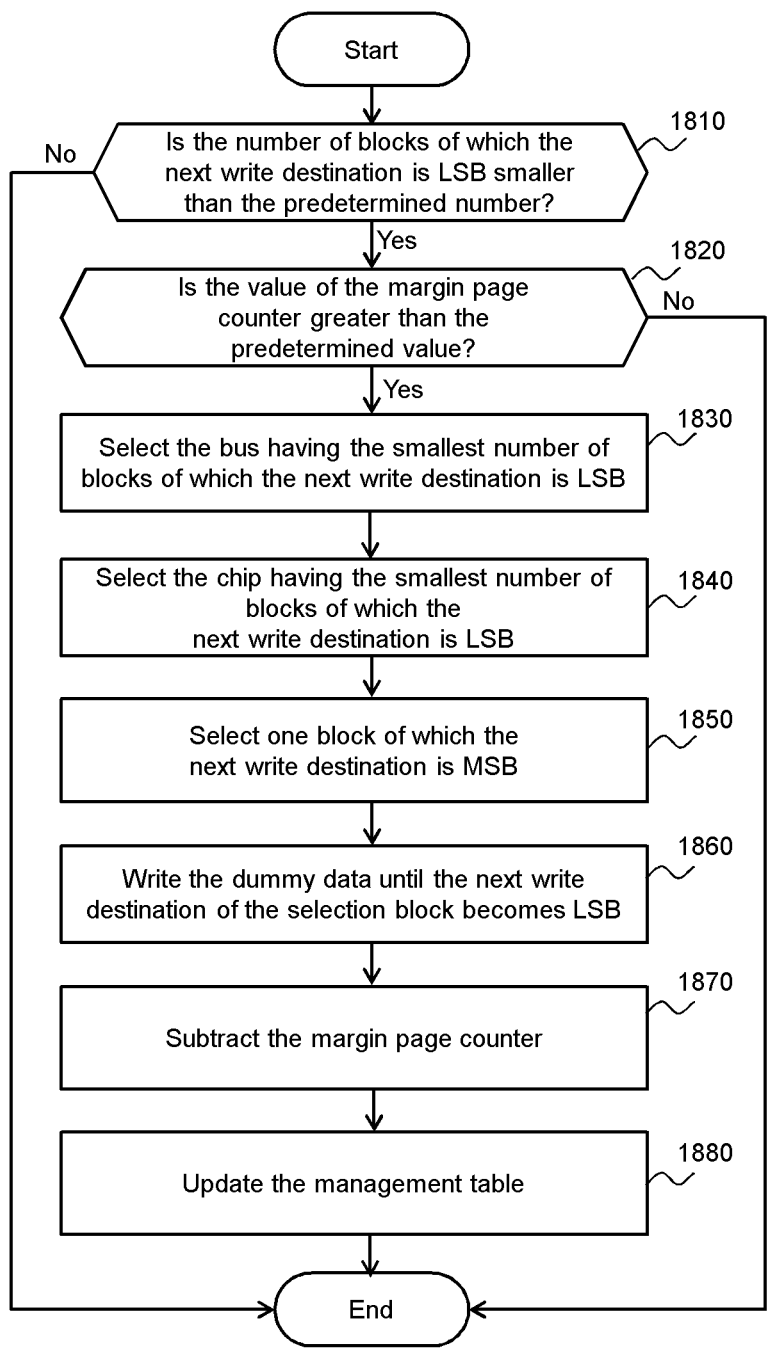
FIG. 18 shows a flow chart of a dummy write process related to the second embodiment.

FIG. 18 shows a flow chart of a dummy write process related to the second embodiment.

With reference to the FIG. 18, on this present embodiment, the procedures of the dummy write conducted immediately following the host write process or asynchronously with the host write process, will be explained in detail.

First, the CPU 21 of the FM controller 20 refers to the table 1010 which corresponds to a specific DIMM 30, and judges whether the total number of the blocks whose next write destination page is the LSB page is less than the predetermined number (for example, 5,000 blocks) or not (Step 1810).

On the other hand, if the judgment results of step 1810 are false (step 1810: Yes), the CPU 21 ends the process. This is because enough LSB pages exist as a write destination of the host data.

On the other hand, if the judgment results of step 1810 are true (step 1810: No), the CPU 21 judges whether the number of the margin pages 1511 before update on the margin page counter 1510 is equal to or larger than the predetermined value (for example, 300 pages) or not (Step 1820).

If the judgment results of step 1820 are false (step 1820: No), the CPU 21 ends the process. This is because the dummy write decreases the margin pages further than the predetermined value.

On the other hand, if the judgment results of step 1820 are true (step 1820: Yes), the CPU 21 performs the process of step 1830 in order to perform the dummy write.

On step 1830, the CPU 21 refers to the table 1010 which corresponds to the above-mentioned specific DIMM 30, and selects the bus with least block whose next write destination page is the LSB page (for example, the bus #1 according to the FIG. 10A).

And, the CPU 21 refers to the table 1020 which corresponds to the bus #1 selected at step 1830, and selects the FM chip with the least block whose next write destination page is the LSB page (for example, FM chip #1-2 according to the FIG. 10B (Step 1840).

And, the CPU 21 refers to the table 1030 which corresponds to the selected FM chip #1-2 at step 1840, and selects one block whose next write destination page is the MSB page (for example, block #1) (Step 1850).

And, the CPU 21 writes the dummy data to the free page (MSB page) until the next write destination page of the selected block #1 at step 1850 becomes LSB page (Step 1860). In particular, for example, in case the CPU 21 writes the dummy data to the pages #42 and #43 of the block #1, it is page 44 which the next write destination page becomes the LSB page.

And, the CPU 21 subtracts the margin pages from the number of the margin pages 1511 before update for the number of the pages in which the dummy data is written at step 1860 from the margin page counters 1510 and 1610 (Step 1870). This means that the margin pages for the pages in which the dummy data is written, have been consumed. In particular, for example, if the CPU 21 has performed dummy write to the pages 42 and 43 of the block 1031 "1", it will subtract pages for 2 pages from the margin pages 1511 and 1611 before update.

Finally, the CPU 21 updates the table 1010, 1020 and 1030 in accordance with which the next write destination page (for example, page #44 of the block #1) of the block in which the dummy write is written (Step 1880).

With the completion of step 1880, the dummy write process ends.

The above is the flow of the dummy write process on this present embodiment.

With this, the explanation of the second embodiment is completed.

Some embodiments have been explained so far, but this present embodiment is not limited to those embodiments, and there is no question that various changes can be possible without departing from the scope thereof.

For example, a non-volatile semiconductor storage medium is not limited to the MLC memory as mentioned above. With respect to which should be mapped with the block page number, LSB page or MSB page, it may not be a mapping as shown in the FIG. 7B. For example, it may be a NAND flash memory of MLC type of which a page whose remainder is 0 of a page number divided by 2 is mapped with the LSB page, and a page whose remainder is 1 of a page number divided by 2 is mapped with the MSB page.

Also, a non-volatile semiconductor storage medium is not limited to the flash memory. It may be a storage medium having a feature of which at least there is a rule in order of selecting the write destination, and of which the response time is fast and slow depending on the write destination. A non-volatile semiconductor storage medium may be, for example, SCM (Storage Class Memory), more specifically, for example, MRAM (Magnetic Random Access Memory), PRAM (Phase Change Random Access Memory), or ReRAM (Resistance Random Access Memory).

REFERENCE SIGNS LIST

1: Storage system, 10: Flash memory package 20, 20: FM controller, 30: DIMM, 32: FM chip, 400: Flash memory device

The invention claimed is:

1. A storage system coupled to a host apparatus for sending a write command, comprising:
a nonvolatile semiconductor storage medium; and
a controller configured to control the nonvolatile semiconductor storage medium,
wherein the nonvolatile semiconductor storage medium is configured by multiple blocks that are multiple physical areas,
wherein each block of the multiple blocks is configured by multiple pages that are multiple sub-areas,
wherein the multiple pages are two or more first kind pages and two or more second kind pages,
wherein each of the two or more second kind pages is a page whose write performance is lower than that of each of the two or more first kind pages,
wherein, on the each block of the multiple blocks, a page to be a write destination of data, is supposed to change because it is impossible to overwrite the data to the same page,
wherein the controller is configured to perform, when a write command is received from the host apparatus, a host write process including the following processes:
(a1) selecting W blocks from the multiple blocks, wherein W is a natural number; and
(a2) writing write target data in accordance with the write command, to the W next write destination pages which the W blocks include respectively,
wherein each block selected by the process (a1) is a block whose next write destination page is the first kind page,
wherein the controller is configured to perform a non-host write process including the following processes:
(b1) selecting a migration source block from the multiple blocks;
(b2) selecting a block whose next write destination page is the second kind page, as a migration destination block from the multiple blocks; and
(b3) writing one or more data including migration target data in the source block, to the migration destination block until the next write destination page on the migration destination block becomes the first kind page,
wherein the process (b3) includes compressing the migration target data in a reversible fashion, and writing the one or more data including the compressed migration target data, to the migration destination block,
wherein the controller is configured to manage a number of margin pages based on a number of saved pages, the saved pages being the write destination of data consumed by the compression of the migration target data,
wherein the controller is configured to perform, when the number of the blocks whose next write destination page is of the first kind page is less than a first value, and yet the number of the margin pages is equal to or larger than a second value, a dummy write process including the following processes:
(c1) selecting a block whose next write destination page is the second kind
(c2) writing dummy data until the next write destination page on the selected block becomes the first kind page, and
(c3) subtracting the number of the pages to be the write destination of the dummy write from the number of the margin pages,
wherein the controller is configured to manage a number of the blocks whose next write destination page is the first kind page per multiple block groups,
wherein a block selected at the process (a1) is a block selected from the block group with a most abundant number of the blocks whose next write destination page is the first kind page,
wherein a block selected at the process (b2) is a block selected from the block group with a least number of the blocks whose next write destination page is the first kind page, and
wherein a block selected at the process (c1) is a block selected from the block group with the least number of the blocks whose next write destination page is the first kind page.

2. The storage system according to claim 1, wherein the controller is configured to perform the dummy write process while not performing the host write process.

3. The storage system according to claim 1, wherein the controller is configured to add the number of the saved pages to the number of the margin pages, and yet reduce the number of pages in which the dummy data is stored from the margin pages.

4. The storage system according to claim 1, wherein the non-host write process is a reclamation process, wear-leveling process or refresh process.

5. The storage system according to claim 1,
wherein the nonvolatile semiconductor storage medium is a NAND type flash memory which comprises a Multi Level Cell (MLC) type memory cell,
wherein the first kind page is a Least Significant Bit (LSB) page, and
wherein the second kind page is a Most Significant Bit (MSB) page.

6. The storage system according to claim 1, comprising:
multiple nonvolatile semiconductor storage devices, and
a storage controller configured to receive a write command from the host apparatus and control the multiple nonvolatile semiconductor storage devices,
wherein each nonvolatile semiconductor storage device comprises,
the nonvolatile semiconductor storage medium, and
a medium controller which is coupled to the storage controller and is configured to control the nonvolatile semiconductor storage medium, and
wherein the storage controller is configured to send the write command received from the host apparatus to at least one nonvolatile semiconductor storage device out of the multiple nonvolatile semiconductor storage devices,
wherein the medium controller of the at least one nonvolatile semiconductor storage device is configured to receive the write command from the storage controller, and based on the write command, perform the host write process, and
wherein the controller is configured to include the storage controller and each medium controller.

7. A storage control method of a storage system which comprises a nonvolatile semiconductor storage medium,
wherein the nonvolatile semiconductor storage medium consists of multiple blocks that are multiple physical areas,
wherein each block of the multiple blocks is configured by multiple pages that are multiple sub-areas,
wherein the multiple pages are two or more first kind pages and two or more second kind pages,
wherein each of the two or more second kind pages is a page whose write performance is lower than that of each of the two or more first kind pages, and wherein, on the each block of the multiple blocks, a page to be the write destination of the data, is supposed to change because it is impossible to overwrite the data to the same page, the storage control method comprising steps of:
  receiving a write command from a host apparatus;
  when receiving the write command, performing a host write process including the following processes:
    (a1) selecting W blocks from the multiple blocks, wherein W is a natural number; and
    (a2) writing write target data in accordance with the write command, to the W next write destination pages which the W blocks include respectively,
    wherein each block selected by the process (a1) is a block whose next write destination page is the first kind page; and
  performing a non-host write process including the following processes:
    (b1) selecting a migration source block from the multiple blocks;
    (b2) selecting a block whose next write destination page is the second kind page, as a migration destination block from the multiple blocks; and
    (b3) writing one or more data including migration target data in the source block, to the migration destination block until the next write destination page on the migration destination block becomes the first kind page,
  wherein the process (b3) includes compressing the migration target data in a reversible fashion, and writing the one or more data including the compressed migration target data, to the migration destination block,
  managing a number of margin pages based on a number of saved pages, the saved pages being the write destination of data consumed by the compression of the migration target data,
  when the number of the blocks whose next write destination page is of the first kind page is less than a first value, and yet the number of the margin pages is equal to or larger than a second value, performing a dummy write process including the following processes:
    (c1) selecting a block whose next write destination page is the second kind page,
    (c2) writing dummy data until the next write destination page on the selected block becomes the first kind page, and
    (c3) subtracting the number of the pages to be the write destination of the dummy write from the number of the margin pages,
  managing a number of the blocks whose next write destination page is the first kind page per multiple block groups, and
  wherein a block selected at the process (a1) is a block selected from the block group with a most abundant number of the blocks whose next write destination page is the first kind page,
  wherein a block selected at the process (b2) is a block selected from the block group with a least number of the blocks whose next write destination page is the first kind page, and
  wherein a block selected at the process (c1) is a block selected from the block group with the least number of the blocks whose next write destination page is the first kind page.

* * * * *